(12) United States Patent
Kasai et al.

(10) Patent No.: US 9,532,402 B2
(45) Date of Patent: Dec. 27, 2016

(54) HONEYCOMB STRUCTURE

(71) Applicant: NGK INSULATORS, LTD., Nagoya (JP)

(72) Inventors: Yoshiyuki Kasai, Nagoya (JP);
Yoshimasa Omiya, Nagoya (JP);
Tadato Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 741 days.

(21) Appl. No.: 13/923,664

(22) Filed: Jun. 21, 2013

(65) Prior Publication Data

US 2013/0284719 A1    Oct. 31, 2013

Related U.S. Application Data

(63) Continuation of application No. PCT/JP2011/079935, filed on Dec. 22, 2011.

(30) Foreign Application Priority Data

Dec. 24, 2010   (JP) ................. 2010-288668

(51) Int. Cl.
*H05B 3/08* (2006.01)
*H05B 3/03* (2006.01)
(Continued)

(52) U.S. Cl.
CPC ............. *H05B 3/03* (2013.01); *B01J 35/04* (2013.01); *F01N 3/2026* (2013.01);
(Continued)

(58) Field of Classification Search
CPC ....... F01N 3/2026; F01N 3/2828; B01J 35/04; H05B 2203/024; H05B 3/03; H05B 3/141; H05B 3/42; Y02T 10/26
(Continued)

(56) References Cited

U.S. PATENT DOCUMENTS 5,063,029 A     11/1991   Mizuno et al.
5,266,278 A  *  11/1993   Harada ................. F01N 3/2026
                                                    219/541
(Continued)

FOREIGN PATENT DOCUMENTS

JP      05-115795 A1    5/1993
JP      05-115796 A1    5/1993
(Continued)

OTHER PUBLICATIONS

Chinese Office Action (Application No. 201180062448.0) dated Aug. 27, 2014.
(Continued)

*Primary Examiner* — Dana Ross
*Assistant Examiner* — Joseph Iskra
(74) *Attorney, Agent, or Firm* — Burr & Brown, PLLC

(57) ABSTRACT

A honeycomb structure including: a tubular honeycomb structure part having porous partition walls and an outer peripheral wall; and a pair of electrode parts arranged on a side surface of the honeycomb structure part, an electrical resistivity of the honeycomb structure part is from 1 to 200 Ωcm, each of the pair of electrode parts is formed into a band-like shape, the one electrode part is disposed opposite to the other electrode part via the center of the honeycomb structure part, and a distance from one end portion in the extending direction of the cells to an end portion of the electrode part which faces the one end portion of the honeycomb structure part in the extending direction of the cells is from 1 to 10% of a length of the honeycomb structure part in the extending direction of the cells.

18 Claims, 7 Drawing Sheets

(51) Int. Cl.
    *F01N 3/20*     (2006.01)
    *F01N 3/28*     (2006.01)
    *H05B 3/14*     (2006.01)
    *H05B 3/42*     (2006.01)
    *B01J 35/04*     (2006.01)

(52) U.S. Cl.
    CPC ........... *F01N 3/2828* (2013.01); *H05B 3/141* (2013.01); *H05B 3/42* (2013.01); *H05B 2203/024* (2013.01); *Y02T 10/26* (2013.01)

(58) Field of Classification Search
    USPC   422/173, 174, 175, 177, 179, 180; 219/205, 541, 542, 552, 553; 428/116, 117, 428/593; 60/300
    See application file for complete search history.

(56) References Cited

U.S. PATENT DOCUMENTS

| | | | |
|---|---|---|---|
| 5,288,975 A | 2/1994 | Kondo | |
| RE35,134 E | 12/1995 | Mizuno et al. | |
| 6,097,011 A * | 8/2000 | Gadkaree | B01D 53/02 |
| | | | 219/202 |
| 2002/0197193 A1 * | 12/2002 | Harada | B01D 53/885 |
| | | | 422/177 |
| 2003/0134084 A1 | 7/2003 | Ichikawa et al. | |
| 2004/0244344 A1 * | 12/2004 | Ichikawa | B01D 39/2068 |
| | | | 55/523 |
| 2005/0229564 A1 | 10/2005 | Okubo et al. | |
| 2007/0231536 A1 * | 10/2007 | Shionoya | B01D 46/2455 |
| | | | 428/116 |
| 2008/0048681 A1 | 2/2008 | Birkhofer et al. | |
| 2012/0076698 A1 * | 3/2012 | Ishihara | B01D 53/00 |
| | | | 422/174 |
| 2012/0187109 A1 | 7/2012 | Noguchi et al. | |
| 2013/0036719 A1 | 2/2013 | Noguchi et al. | |
| 2013/0043236 A1 | 2/2013 | Sakashita et al. | |
| 2013/0043237 A1 | 2/2013 | Sakashita et al. | |
| 2013/0045137 A1 | 2/2013 | Sakashita et al. | |

FOREIGN PATENT DOCUMENTS

| | | |
|---|---|---|
| JP | 05-269387 A1 | 10/1993 |
| JP | 08-141408 A1 | 6/1996 |
| JP | 2931362 B2 | 8/1999 |
| JP | 2007-524786 A1 | 8/2007 |
| JP | 4136319 B2 | 8/2008 |
| JP | 2008-213322 A1 | 9/2008 |
| JP | 2008-231930 A1 | 10/2008 |
| JP | 2008-240631 A1 | 10/2008 |
| JP | 2010-229978 A1 | 10/2010 |
| WO | 2011/043434 A1 | 4/2011 |
| WO | 2011/105567 A1 | 9/2011 |
| WO | 2011/125815 A1 | 10/2011 |
| WO | 2011/125816 A1 | 10/2011 |
| WO | 2011/125817 A1 | 10/2011 |

OTHER PUBLICATIONS

U.S. Appl. No. 14/018,710, filed Sep. 5, 2013, Hosoi et al.
U.S. Appl. No. 13/628,521, filed Sep. 27, 2012, Sakashita et al.
U.S. Appl. No. 13/628,672, filed Sep. 27, 2012, Sakashita et al.
International Search Report and Written Opinion dated Feb. 7, 2012.

* cited by examiner

HONEYCOMB STRUCTURE

BACKGROUND OF THE INVENTION

1. Field of Invention

The present invention relates to a honeycomb structure, and more particularly, it relates to a honeycomb structure which is a catalyst support and also functions as a heater when a voltage is applied thereto and which has an excellent heat shock resistance.

2. Description of Related Art

Heretofore, a honeycomb structure made of cordierite, onto which a catalyst is loaded, has been used in treatment of harmful substances in an exhaust gas discharged from a car engine. Moreover, it is also known that a honeycomb structure formed by a sintered silicon carbide body has been used in purification of the exhaust gas (see, e.g., Patent Document 1).

When the exhaust gas is treated by the catalyst loaded onto the honeycomb structure, a temperature of the catalyst needs to be raised up to a predetermined temperature. However, the catalyst temperature is low at the start of the engine, which has caused the problem that the exhaust gas is not sufficiently purified.

To solve the problem, a method has been investigated in which a heater made of a metal is disposed on an upstream side of a honeycomb structure onto which a catalyst is loaded, to raise a temperature of an exhaust gas (see, e.g., Patent Document 2).

Moreover, it has been disclosed that a honeycomb structure made of a conductive ceramic material and including both end portions provided with electrodes is used as a catalyst support with a heater (see, e.g., Patent Document 3).

PRIOR ART DOCUMENTS

Patent Documents

Patent Document 1: JP 4136319
Patent Document 2: JP 2931362
Patent Document 3: JP-A-8-141408

SUMMARY OF THE INVENTION

When the above-mentioned metal heater is mounted on a car and used, a power source for use in an electric system of the car is used in common, and, for example, the power source of a high voltage of 200 V is used. However, in the metal heater, an electric resistance is low. In consequence, when the above high-voltage power source is used, a current excessively flows. As a result, there has been the problem that a power source circuit is damaged sometimes.

Furthermore, when the heater is made of the metal, the catalyst is not easily loaded onto the heater even if the heater is processed into a honeycomb constitution. Therefore, it has been difficult to integrally dispose the heater and the catalyst.

Additionally, in a catalyst support with a heater in which electrodes are arranged in both end portions of a honeycomb structure made of a conductive ceramic material, the electrodes easily deteriorate, and a resistance value increases sometimes. This is because the electrodes are directly exposed to an exhaust gas, when the catalyst support with the heater is mounted on a car and used.

The present invention has been developed in view of the above-mentioned problems, and an object thereof is to provide a honeycomb structure which is a catalyst support and also functions as a heater when a voltage is applied thereto and which has an excellent heat shock resistance.

To achieve the above-mentioned object, according to the present invention, the following honeycomb structure is provided.

According to a first aspect of the present invention, a honeycomb structure including: a tubular honeycomb structure part having porous partition walls with which a plurality of cells extending from one end surface to the other end surface are formed to become through channels of a fluid is provided, and an outer peripheral wall positioned on an outermost periphery; and a pair of electrode parts arranged on a side surface of the honeycomb structure part, wherein an electrical resistivity of the honeycomb structure part is from 1 to 200 $\Omega$cm, each of the pair of electrode parts is formed into a band-like shape extending in a direction in which the cells of the honeycomb structure part extend, in a cross section perpendicular to the cell extending direction, the one electrode part in the pair of electrode parts is disposed opposite to the other electrode part in the pair of electrode parts via the center of the honeycomb structure part, and a distance from one end portion of the honeycomb structure part in the cell extending direction to an end portion of the electrode part which faces the one end portion of the honeycomb structure part in the cell extending direction is from 1 to 10% of a length of the honeycomb structure part in the cell extending direction.

According to a second aspect of the present invention, honeycomb structure according to the above first aspect is provided, wherein the distance from the one end portion of the honeycomb structure part in the cell extending direction to the end portion of the electrode part which faces the one end portion of the honeycomb structure part in the cell extending direction is from 1 to 10% of the length of the honeycomb structure part in the cell extending direction, and a distance from the other end portion of the honeycomb structure part in the cell extending direction to an end portion of the electrode part which faces the other end portion of the honeycomb structure part in the cell extending direction is from 1 to 10% of the length of the honeycomb structure part in the cell extending direction.

According to a third aspect of the present invention, the honeycomb structure according to the above first or second aspects is provided, wherein an outer peripheral shape of the band-like electrode part is a rectangular shape including at least one curved corner portion, or a rectangular shape including at least one linearly chamfered corner portion.

According to a fourth aspect of the present invention, the honeycomb structure according to any one of the above first to third aspects is provided, wherein an electrical resistivity of the electrode part is from 0.01 to 100 $\Omega$cm.

According to a fifth aspect of the present invention, the honeycomb structure according to any one of the above first to fourth aspects is provided, wherein a conductor having an electrical resistivity lower than that of the electrode part is disposed on the surface of the electrode part.

In the honeycomb structure of the present invention, the electrical resistivity of the honeycomb structure part is from 1 to 200 $\Omega$cm. Therefore, even when a current is allowed to flow by using a high-voltage power source, the current does not excessively flow, so that the honeycomb structure can suitably be used as a heater. Moreover, in the honeycomb structure of the present invention, each of the pair of electrode parts is formed into the band-like shape extending in the direction in which the cells of the honeycomb structure part extend. Furthermore, in the cross section of the honeycomb structure of the present invention which is perpendicular to the cell extending direction, the one electrode part in the pair of electrode parts is disposed opposite to the other electrode part in the pair of electrode parts via the center of the honeycomb structure part. Therefore, in the honeycomb structure of the present invention, it is possible to suppress a deviation of a temperature distribution when the voltage is applied. Furthermore, in the honeycomb structure of the present invention, the distance from "the one end portion of the honeycomb structure part" to ""the end portion of the electrode part" which faces "the one end portion of the honeycomb structure part" in the cell extending direction" is from 1 to 10% of the length of the honeycomb structure part in the cell extending direction. Therefore, in the honeycomb structure of the present invention, it is possible to suppress generation of a large stress in the honeycomb structure part, even when a rapid temperature change takes place in a case where the honeycomb structure is mounted on an exhaust system of an internal combustion engine and used. The above "one end portion of the honeycomb structure part" is the one end portion of the honeycomb structure part in the cell extending direction. Furthermore, it is possible to evenly generate heat, when a voltage is applied to the honeycomb structure.

DETAILED DESCRIPTION OF THE INVENTION

Next, a mode for carrying out the present invention will be described in detail with reference to the drawings, but it should be understood that the present invention is not limited to the following embodiments and that design modifications, improvements and the like are suitably added on the basis of ordinary knowledge of a person skilled in the art without departing from the gist of the present invention.

Figure 1:
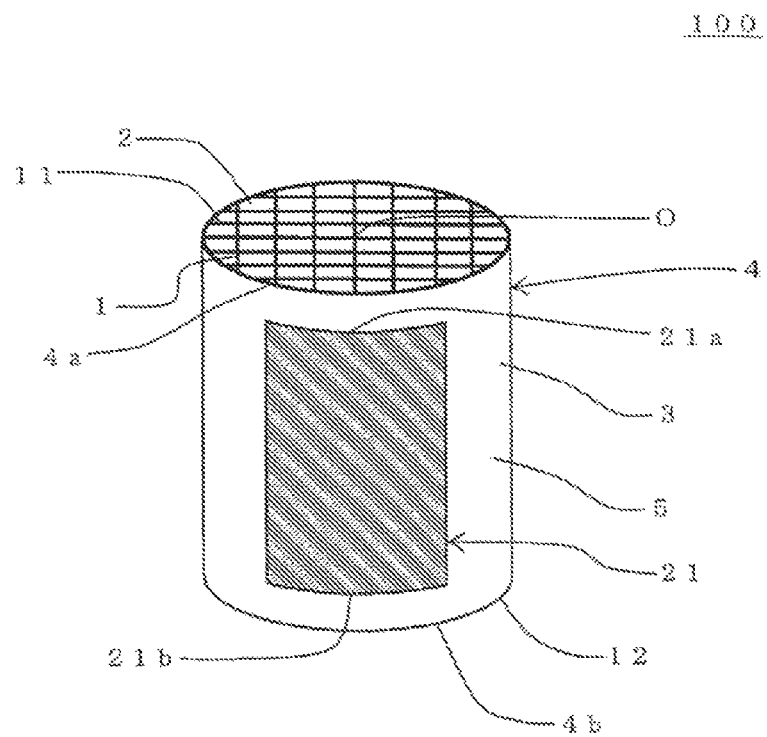
FIG. 1 is a perspective view schematically showing one embodiment of a honeycomb structure of the present invention.
Figure 2:
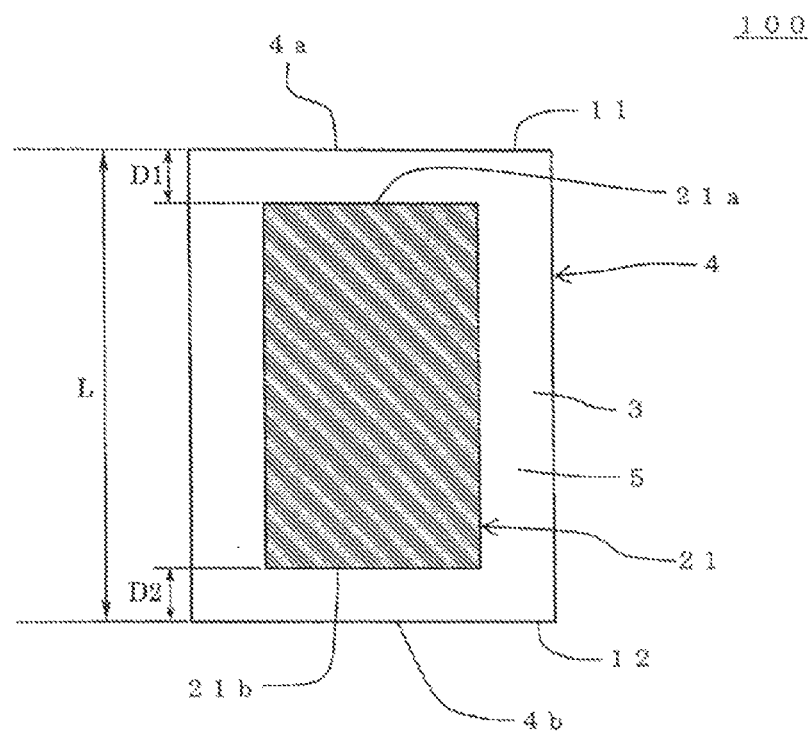
FIG. 2 is a front view schematically showing the one embodiment of the honeycomb structure of the present invention.
Figure 3:
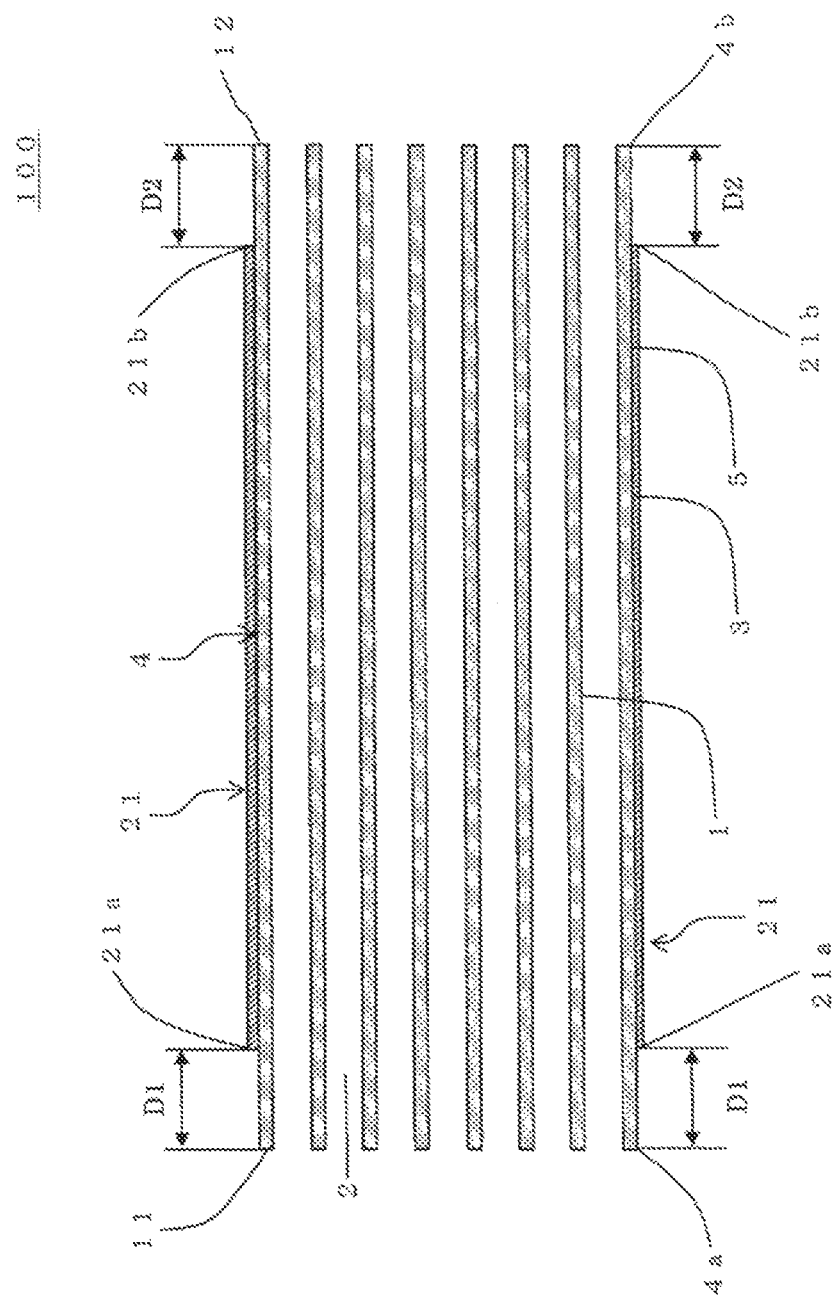
FIG. 3 is a schematic view showing a cross section of the one embodiment of the honeycomb structure of the present invention which is parallel to a cell extending direction.
Figure 4:
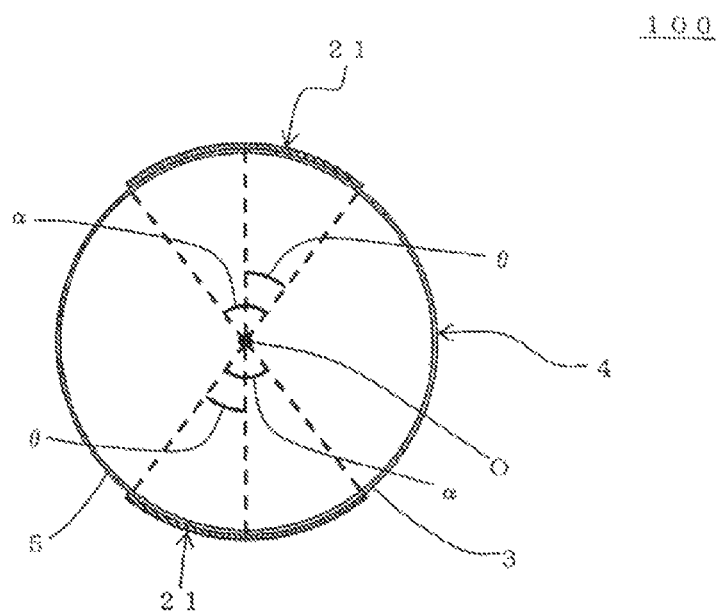
FIG. 4 is a schematic view showing a cross section of the one embodiment of the honeycomb structure of the present invention which is perpendicular to the cell extending direction.

(1) Honeycomb Structure:

One embodiment of a honeycomb structure of the present invention includes a tubular honeycomb structure part 4 having porous partition walls 1 and an outer peripheral wall 3 positioned on an outermost periphery, and a pair of electrode parts 21 and 21 arranged on a side surface 5 of the honeycomb structure part 4, as in a honeycomb structure 100 shown in FIG. 1 to FIG. 4. With the partition walls 1, a plurality of cells 2 "extending from one end surface 11 to the other end surface 12" are formed "to become through channels of a fluid". In the honeycomb structure 100, an electrical resistivity of the honeycomb structure part 4 is from 1 to 200 Ωcm. Each of the pair of electrode parts 21 and 21 of the honeycomb structure 100 is formed into a band-like shape extending in a direction in which the cells 2 of the honeycomb structure part 4 extend. Moreover, in a cross section of the honeycomb structure 100 which is perpendicular to the extending direction of the cells 2, the one electrode part 21 in the pair of electrode parts 21 and 21 is disposed opposite to the other electrode part 21 in the pair of electrode parts 21 and 21 via a center O of the honeycomb structure part 4. Furthermore, a distance D1 is from 1 to 10%, of a length L of the honeycomb structure part 4 in the extending direction of the cells 2. The distance D1 is a distance from one end portion 4a of the honeycomb structure part 4 in the extending direction of the cells 2 to an end portion of the electrode part 21 (one end portion 21a of the electrode part) which faces the one end portion 4a of the honeycomb structure part 4 in the extending direction of the cells 2. FIG. 1 is a perspective view schematically showing the one embodiment of the honeycomb structure of the present invention. FIG. 2 is a front view schematically showing the one embodiment of the honeycomb structure of the present invention. FIG. 3 is a schematic view showing a cross section of the one embodiment of the honeycomb structure of the present invention which is parallel to the cell extending direction. FIG. 4 is a schematic view showing a cross section of the one embodiment of the honeycomb structure of the present invention which is perpendicular to the cell extending direction. It is to be noted that in FIG. 4, the partition walls are omitted.

As described above, in the honeycomb structure 100 of the present embodiment, the electrical resistivity of the honeycomb structure part 4 is from 1 to 200 Ωcm. Therefore, even when a current is allowed to flow by use of a high-voltage power source, the current does not excessively flow, so that the honeycomb structure can suitably be used as a heater. Moreover, in the honeycomb structure 100, each of the pair of electrode parts 21 and 21 is formed into the band-like shape, and the one electrode part 21 is disposed opposite to the other electrode part 21 via the center of the honeycomb structure part 4. Therefore, it is possible to suppress a deviation of a temperature distribution of the honeycomb structure part 4, when a voltage is applied between the pair of electrode parts 21 and 21. Furthermore, in the honeycomb structure 100, the distance D1 is from 1 to 10% of the length L of the honeycomb structure part 4 in the extending direction of the cells 2. In consequence, it is possible to suppress generation of a large stress in the honeycomb structure part 4, even when a rapid temperature change takes place.

It is to be noted that "the one electrode part 21 is disposed opposite to the other electrode part 21 via the center O of the honeycomb structure part 4" means that the pair of electrode parts 21 and 21 are arranged in the honeycomb structure part 4 so as to satisfy the following positional relation (P). The above positional relation (P) is a positional relation in which an angle formed between a line segment (A) and a line segment (B) is in a range of 170 to 190° in the cross section perpendicular to the extending direction of the cells 2. The above line segment (A) is a line segment connecting a center point of the one electrode part 21 (the center point in "a peripheral direction of the honeycomb structure part 4") to the center O of the honeycomb structure part 4. The above line segment (B) is a line segment connecting a center point of the other electrode part 21 (the center point in "the peripheral direction of the honeycomb structure part 4") to the center O of the honeycomb structure part 4. The angle β is an angle around "the center O".

In the honeycomb structure 100 of the present embodiment, a material of the partition walls 1 and the outer peripheral wall 3 preferably contains a silicon-silicon carbide composite material or a silicon carbide material as a main component, and the material is further preferably the silicon-silicon carbide composite material or silicon carbide. When "the material of the partition walls 1 and the outer peripheral wall 3 contains the silicon-silicon carbide composite material or the silicon carbide material as the main component", it is meant that the partition walls 1 and the outer peripheral wall 3 contain 90 mass % or more of the silicon-silicon carbide composite material or the silicon carbide material in the whole material. By the use of such a material, the electrical resistivity of the honeycomb structure part can be from 1 to 200 Ωcm. Here, the silicon-silicon carbide composite material contains silicon carbide particles as aggregates, and silicon as a binding agent to bind the silicon carbide particles. The plurality of silicon carbide particles are preferably bound by silicon so as to form pores among the silicon carbide particles. Moreover, the silicon carbide material is obtained by mutually sintering the silicon carbide particles. The electrical resistivity of the honeycomb structure part is a value at 400° C.

As shown in FIG. 1 to FIG. 4, in the honeycomb structure 100 of the present embodiment, the side surface 5 of the honeycomb structure part 4 is provided with the pair of electrode parts 21 and 21. In the honeycomb structure 100 of the present embodiment, the voltage is applied between the pair of electrode parts 21 and 21, thereby generating heat. The voltage to be applied is preferably from 12 to 900 V, and further preferably from 64 to 600 V.

As shown in FIG. 1 to FIG. 4, in the honeycomb structure 100 of the present embodiment, (i) each of the pair of electrode parts 21 and 21 is formed into the band-like shape extending in the direction in which the cells 2 of the honeycomb structure part 4 extend. Moreover, (ii) in the cross section perpendicular to the extending direction of the cells 2, the one electrode part 21 in the pair of electrode parts 21 and 21 is disposed opposite to the other electrode part 21 in the pair of electrode parts 21 and 21 via the center O of the honeycomb structure part 4. Further in the honeycomb structure 100 of the present embodiment, 0.5 times a center angle α is preferably from 15 to 65°, and further preferably from 30 to 60°. The center angle α is a center angle of each of the electrode parts 21 and 21 in the cross section perpendicular to the extending direction of the cells 2. 0.5 times the center angle α is an angle θ of 0.5 times the center angle α. In this way, the above (i) and the above (ii) are satisfied, and furthermore, the angle θ of 0.5 times the center angle α of each of the electrode parts 21 and 21 is from 15 to 65° in the cross section perpendicular to the extending direction of the cells 2. According to such a constitution, it is possible to more effectively suppress a deviation of the current flowing through the honeycomb structure part 4, when the voltage is applied between the pair of electrode parts 21 and 21. In consequence, a deviation of the heat generation in the honeycomb structure part 4 can be suppressed. As shown in FIG. 4, "the center angle α of the electrode part 21" is an angle formed between two line segments connecting both ends of the electrode part 21 to the center O of the honeycomb structure part 4 in the cross section perpendicular to the extending direction of the cells 2. The above "angle formed between the two line segments" is an inner angle of a portion of the center O in a shape (e.g., a fan shape) formed by the electrode part 21, a line segment (a) and a line segment (b) in the cross section perpendicular to the extending direction of the cells 2. The above line segment (a) is a line segment connecting one end portion of the electrode part 21 to the center O. The above line segment (b) is a line segment connecting the other end portion of the electrode part 21 to the center O.

Moreover, "the angle θ of 0.5 times the center angle α" of the one electrode part 21 is preferably a size of 0.8 to 1.2 times "the angle θ of 0.5 times the center angle α" of the other electrode part 21, and is further preferably a size of 1.0 times (the same size). In consequence, it is possible to suppress the deviation of the current flowing through the honeycomb structure part 4, when the voltage is applied between the pair of electrode parts 21 and 21. As a result, it is possible to suppress the deviation of the heat generation in the honeycomb structure part 4.

As shown in FIG. 2, the distance D1 is from 1 to 10% of the length L of the honeycomb structure part 4 in the extending direction of the cells 2. The distance D1 is preferably longer than 2% of the length L. Moreover, the distance D1 is preferably shorter than 8% of the length L. In such a range of the distance D1, it is possible to suppress the generation of the large stress in the honeycomb structure part, even when the rapid temperature change takes place in a case where the honeycomb structure is mounted on an exhaust system of an internal combustion engine and used. Furthermore, it is possible to evenly generate the heat, when the voltage is applied to the honeycomb structure. In consequence, the honeycomb structure of the present embodiment has an excellent heat shock resistance, and can realize the even heat generation by energization. When the distance D1 is shorter than 1% of the length L, the large stress is generated in the vicinity of a boundary between the honeycomb structure part 4 and the electrode part 21 around each end of the honeycomb structure part. As a result, cracks are unfavorably easily generated. In particular, the large stress is easily generated in the vicinity of "each corner portion of the electrode part 21" in the honeycomb structure part 4. Moreover, when the distance D1 is longer than 10% of the length L, the heat unfavorably cannot evenly be generated at the applying of the voltage to the honeycomb structure. The distance D1 is a distance from the one end portion 4a of the honeycomb structure part 4 in the extending direction of the cells 2 to "the end portion 21a of the electrode part 21 (the one end portion of the electrode part)" which faces "the one end portion 4a of the honeycomb structure part 4" in the extending direction of the cells 2. In other words, the distance D1 is a distance from the one end portion 4a of the honeycomb structure part 4 to the one end portion 21a of the electrode part 21.

Moreover, as shown in FIG. 2, it is preferable that the distance D1 is from 1 to 10% of the length L of the honeycomb structure part 4 in the extending direction of the cells 2 and that a distance D2 is from 1 to 10% of the length L of the honeycomb structure part 4 in the extending direction of the cells 2. Each of the distances D1 and D2 is further preferably from 2 to 8% of the length L. In this way, each of the distances D1 and D2 is from 1 to 10% of the length L, thereby producing the following advantages. That is, it is possible to further effectively suppress the generation of the large stress in the honeycomb structure part, even when the rapid temperature change takes place in the case where the honeycomb structure is mounted on the exhaust system of the internal combustion engine. Furthermore, it is possible to further effectively and evenly generate the heat, when the voltage is applied to the honeycomb structure. The distance D1 is preferably the same distance as the distance D2, but may be different from the distance. Moreover, the pair of electrode parts 21 and 21 preferably have the same distance D1, but may have different distances D1. Furthermore, the pair of electrode parts 21 and 21 preferably have the same distance D2, but may have different distances D2. The distance D2 is a distance from the other end portion 4b of the honeycomb structure part 4 in the extending direction of the cells 2 to "the end portion 21b of the electrode part 21 (the other end portion of the electrode part)" which faces "the other end portion 4b of the honeycomb structure part 4" in the extending direction of the cells 2. In other words, the distance D2 is a distance from the other end portion 4b of the honeycomb structure part 4 to the other end portion 21b of the electrode part 21.

It is to be noted that ""the end portion 21a of the electrode part 21 (the one end portion of the electrode part" which faces "the one end portion 4a of the honeycomb structure part 4" in the extending direction of the cells 2" is defined as follows. That is, "the end portion" is positioned on "an upstream side" when the exhaust gas flows (the one end portion 21a of the electrode part) in both the end portions 21a and 21b of the electrode part 21. In the above definition, the one end portion 4a of the honeycomb structure part 4 is an end portion "on the upstream side" when the exhaust gas flows, and the other end portion 4b of the honeycomb structure part 4 is an end portion "on a downstream side" when the exhaust gas flows. Moreover, ""the end portion 21b of the electrode part 21 (the other end portion of the electrode part)" which faces "the other end portion 4b of the honeycomb structure part 4" in the extending direction of the cells 2" is defined as follows. That is, "the end portion" is positioned on "the downstream side" when the exhaust gas flows (the other end portion 21b of the electrode part) in both the end portions 21a and 21b of the electrode part 21. In the above definition, the one end portion 4a of the honeycomb structure part 4 is an end portion "on the upstream side" when the exhaust gas flows, and the other end portion 4b of the honeycomb structure part 4 is an end portion "on the downstream side" when the exhaust gas flows.

In the honeycomb structure of the present embodiment, the electrode part 21 has, for example, a shape obtained by curving a planar rectangular member along an outer periphery of a cylindrical shape as shown in FIG. 1 to FIG. 4. Here, a shape obtained when the curved electrode part 21 is deformed into a planar member which is not curved is called "the planar shape" of the electrode part 21. The above "planar shape" of the electrode part 21 shown in FIG. 1 to FIG. 4 is a rectangular shape. Moreover, "the outer peripheral shape of the electrode part" means "the outer peripheral shape in the planar shape of the electrode part".

In the honeycomb structure of the present embodiment, as shown in FIG. 1 to FIG. 4, the outer peripheral shape of the band-like electrode part 21 may be the rectangular shape. In a preferable configuration shown in FIG. 5, the outer peripheral shape of the band-like electrode part 21 is a rectangular shape including curved corner portions. Moreover, in another preferable configuration shown in FIG. 6, the outer peripheral shape of the band-like electrode part 21 is a rectangular shape including linearly chamfered corner portions.

Figure 5:
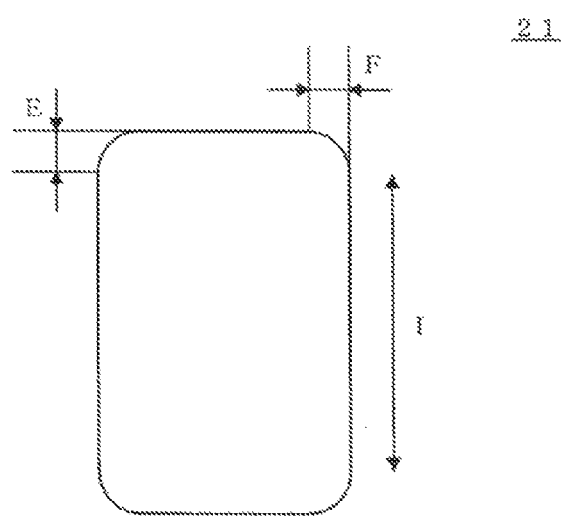
FIG. 5 is a plan view schematically showing an electrode part.

The outer peripheral shape of the electrode part 21 shown in FIG. 5 is the rectangular shape including four curved corner portions. The outer peripheral shape of the electrode part 21 may be a shape in which at least one corner portion is curved. The outer peripheral shape of the electrode part 21 is the rectangular shape including at least one curved corner portion, and hence the heat shock resistance of the honeycomb structure can further be enhanced. In the preferable configuration of the outer peripheral shape of the electrode part 21, four corner portions of the rectangular shape have a curved shape. When each of the corner portions of the electrode part is formed at right angles, a stress in the vicinity of "the corner portion of the electrode part" in the honeycomb structure part tends to be relatively higher than that of the other portions. On the other hand, when the corner portion of the electrode part is curved, it is possible to further decrease the stress in the vicinity of "the corner portion of the electrode part" in the honeycomb structure part.

As shown in FIG. 5, each of the curved corner portions preferably has a circular shape, but may have a curved line other than the circular shape. Moreover, the curved corner portion is preferably smoothly connected to a portion corresponding to "a side" of the rectangular shape. In other words, a connecting portion between the above corner portion and the portion corresponding to "the side" of the rectangular shape preferably has respective common tangent lines. Moreover, the above corner portion and the portion corresponding to "the side" of the rectangular shape may form a pointed connecting portion as in a vertex. When the pointed connecting portion is formed, an inner angle of the connecting portion is preferably 90° or more. It is to be noted that the connecting portion is a portion where a straight line is connected to a straight line, a curved line is connected to a straight line, or a curved line is connected to a curved line. For example, the rectangular shape has a corner portion connected to two sides (a vertex portion). Moreover, as shown in FIG. 5, the curved corner portion is outwardly convex, but may be inwardly convex (i.e., outwardly concave). When the curved corner portion is inwardly convex, the inner angle of the connecting portion is preferably 90° or more. When the curved line is connected to the straight line, "the inner angle" is an angle between the straight line and a tangent line of the curved line in the connecting portion.

A length of "the curved corner portion" "in a cell extending direction I" is a length E of the corner portion in a cell direction. The length E of the corner portion in the cell direction is preferably from 2 to 35%, and further preferably from 5 to 25% of the length of the electrode part 21 "in the cell extending direction I". When the length is shorter than 2%, the effect of further enhancing the heat shock resistance of the honeycomb structure deteriorates sometimes. When the length is longer than 35%, the heat is not easily evenly generated sometimes in a case where the voltage is applied to the honeycomb structure. Moreover, a length of "the curved corner portion" "in a direction perpendicular to the cell extending direction I" is a length F of the corner portion in a vertical direction. The length F of the corner portion in the vertical direction is preferably from 2 to 35%, and further preferably from 5 to 25% of the length of the electrode part 21 "in the direction perpendicular to the cell extending direction I". When the length is shorter than 2%, the effect of further enhancing the heat shock resistance of the honeycomb structure deteriorates sometimes. When the length is longer than 35%, the heat is not easily evenly generated sometimes in the case where the voltage is applied to the honeycomb structure.

Figure 6:
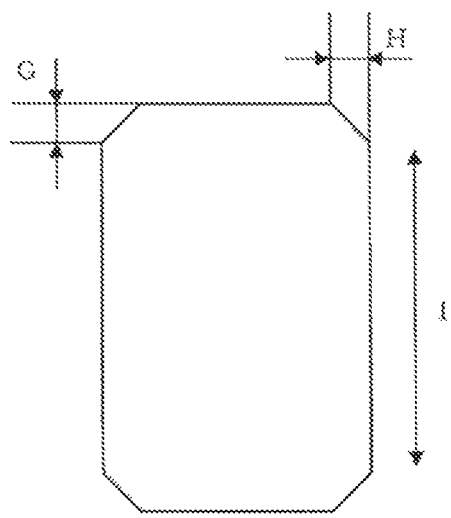
FIG. 6 is a plan view schematically showing the electrode part.

Moreover, the outer peripheral shape of the electrode part 21 shown in FIG. 6 is the rectangular shape including four linearly chamfered corner portions. The outer peripheral shape of the electrode part 21 may be a shape in which at least one corner portion is linearly chamfered. A preferable configuration of the outer peripheral shape of the electrode part 21 is the rectangular shape including four linearly chamfered corner portions. When the outer peripheral shape of the electrode part 21 is a rectangular shape including at least one linearly chamfered corner portion, it is possible to obtain an effect similar to the effect obtained when "the outer peripheral shape of the electrode part 21 is the rectangular shape including at least one curved corner portion". When the corner portion is curved, a higher effect can be obtained.

A length of "the linearly chamfered corner portion" "in the cell extending direction I" is a length G of the corner portion in the cell direction. The length G of the corner portion in the cell direction is preferably from 2 to 35%, and further preferably from 5 to 25% of the length of the electrode part 21 "in the cell extending direction I". When the length is shorter than 2%, the effect of further enhancing the heat shock resistance of the honeycomb structure deteriorates sometimes. When the length is longer than 35%, the heat is not easily evenly generated sometimes in the case where the voltage is applied to the honeycomb structure. Moreover, a length of "the linearly chamfered corner portion" "in the direction perpendicular to the cell extending direction I" is a length H of the corner portion in the vertical direction. The length H of the corner portion in the vertical direction is preferably from 2 to 35%, and further preferably from 5 to 25% of the length of the electrode part 21 "in the direction perpendicular to the cell extending direction I". When the length is shorter than 2%, the effect of further enhancing the heat shock resistance of the honeycomb structure deteriorates sometimes. When the length is longer than 35%, the heat is not easily evenly generated sometimes in the case where the voltage is applied to the honeycomb structure. The outer peripheral shape of the electrode part 21 may be a rectangular shape having both of the curved corner portion and the linearly chamfered corner portion.

Moreover, "band-like" in the present description can be referred to as sheet-like or film-like. That is, "the electrode part" in the present description does not include an outward projecting portion such as "an electrode terminal projecting portion" of the present description.

In the honeycomb structure of the present embodiment, each of the electrode parts preferably does not have "a corner portion having an inner angle smaller than 90°". This is because in the electrode part including "the corner portion having the inner angle smaller than 90°", a high stress is easily applied to the honeycomb structure part in the vicinity of "the corner portion" of the electrode part "which has the inner angle smaller than 90°", when a heat shock is given to the honeycomb structure.

Figure 7A:
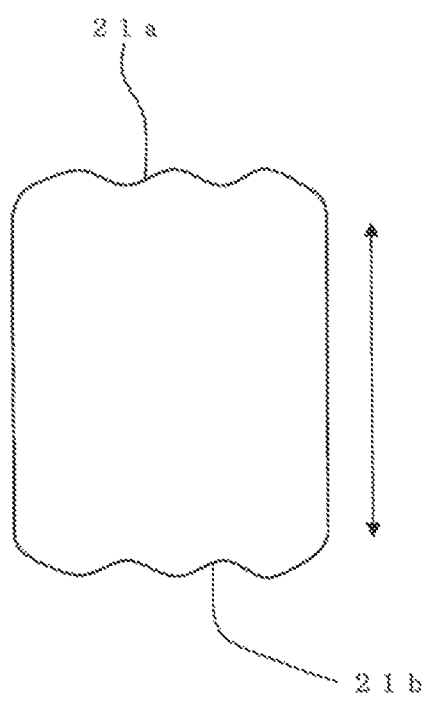
FIG. 7A is a plan view schematically showing the electrode part.
Figure 7B:
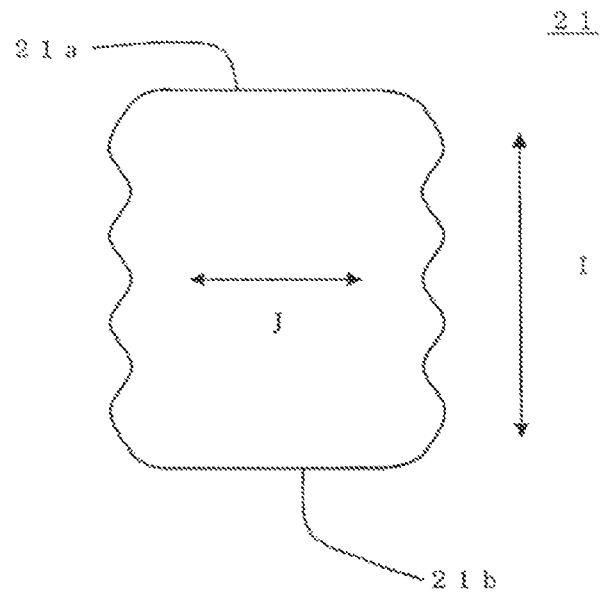
FIG. 7B is a plan view schematically showing the electrode part.

Moreover, in the honeycomb structure of the present embodiment, it is also a preferable configuration that a shape of at least one end portion of the band-like electrode part in the cell extending direction of the honeycomb structure part is constituted of a curved line such as a waved shape or a circular shape. Moreover, the curved line and a straight line are preferably used in a complex manner. FIG. 7A also shows a preferable configuration where both end portions of the band-like electrode part 21 in the cell extending direction I of the honeycomb structure part (the one end portion 21a of the electrode part and the other end portion 21b of the electrode part) have a waved shape. In consequence, with the result that the shape of at least one end portion is the waved shape, generation of a large stress in the electrode part can be suppressed. Furthermore, FIG. 7B also shows a preferable configuration where both end portions of the band-like electrode part 21 in a peripheral direction J of the honeycomb structure part have a waved shape. Consequently, the generation of the large stress in the electrode part can be suppressed. In a further preferable configuration, the whole outer periphery of the band-like electrode part 21 has a waved shape. In consequence, the generation of the large stress in the electrode part can be suppressed. It is to be noted that when the distance from the end portion of the electrode part to the end portion of the honeycomb structure part is not constant as in the case where the end portion of the electrode part is formed into the waved shape, the distance to the closest portion is from 1 to 10% of the length of the honeycomb structure part.

Furthermore, in the honeycomb structure of the present embodiment, it is also a preferable configuration that the outer peripheral shape of the band-like electrode part is a smooth shape which does not have any vertexes, or a shape having the corner portions (the vertex portions) and also having the inner angle of "at least one corner portion" in excess of 90°. Moreover, when the outer peripheral shape of the electrode part has the corner portions, the inner angle of each of the corner portions is further preferably in excess of 90°. In consequence, it is possible to suppress the generation of the large stress in the honeycomb structure part, even when the rapid temperature change takes place in the case where the honeycomb structure is mounted on the exhaust system of the internal combustion engine and used.

In the honeycomb structure of the present embodiment, the electrical resistivity of the electrode part 21 may be uniform, or partially vary. When the electrical resistivity of the electrode part 21 is uniform, the electrical resistivity of the electrode part 21 is preferably from 0.01 to 100 Ωcm, further preferably from 0.1 to 100 Ωcm, and especially preferably from 0.1 to 50 Ωcm. In such a range of the electrical resistivity of the electrode part 21, each of the pair of electrode parts 21 and 21 effectively performs a function of an electrode in a piping line through which a high-temperature exhaust gas flows. When the electrical resistivity of the electrode part 21 is smaller than 0.01 Ωcm, a temperature of the honeycomb structure part easily rises sometimes in the vicinities of both ends of the electrode part 21 in the cross section perpendicular to the cell extending direction. When the electrical resistivity of the electrode part 21 is larger than 100 Ωcm, the current does not easily flow. Therefore, the electrode part does not easily perform the function of the electrode sometimes. The electrical resistivity of the electrode part is a value at 400° C.

Figure 8:
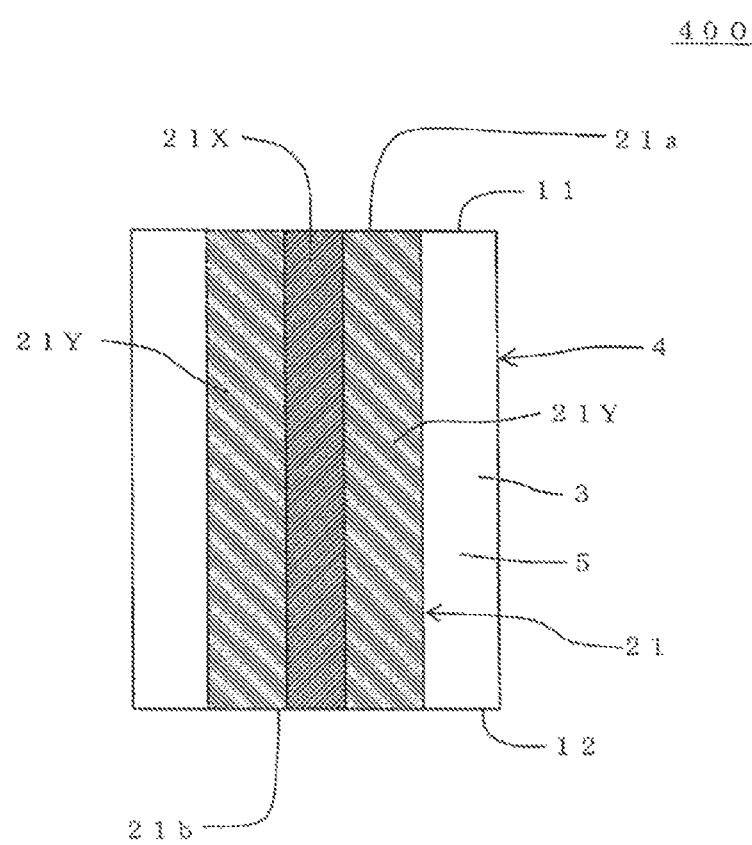
FIG. 8 is a front view schematically showing another embodiment of the honeycomb structure of the present invention.
Figure 9:
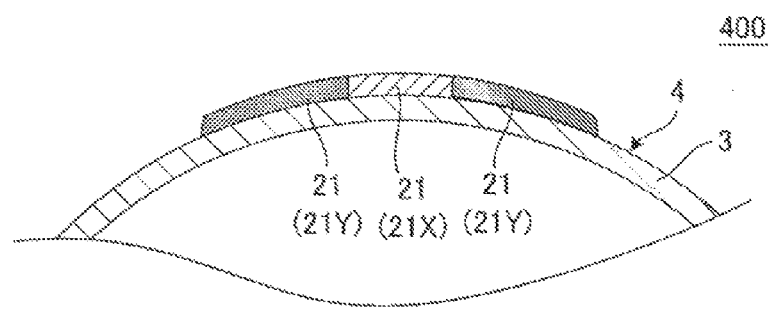
FIG. 9 is a schematic view showing a cross section of the embodiment of the honeycomb structure of the present invention which is perpendicular to the cell extending direction.

When the electrical resistivity of the electrode part 21 partially varies, the electrode part 21 is constituted of a center portion 21X and extended portions 21Y and 21Y as in a honeycomb structure 400 shown in FIG. 8 and FIG. 9, and an electrical resistivity of the center portion 21X of the electrode part 21 is preferably smaller than an electrical resistivity of each of the extended portions 21Y and 21Y of the electrode part 21. The center portion 21X is a portion of the electrode part 21 in the peripheral direction, in the cross section perpendicular to the extending direction of the cells 2. The extended portions 21Y and 21Y are portions positioned on both sides of the center portion 21X in the peripheral direction, in the cross section perpendicular to the extending direction of the cells 2. In consequence, when the electrical resistivity of the center portion 21X of the electrode part 21 is smaller than the electrical resistivity of the extended portion 21Y of the electrode part 21 and when the voltage is applied to the center portion 21X of the electrode part 21, the current easily flows through the center portion 21X having a low electrical resistivity. Therefore, the deviation of the flow of the current in the cell extending direction of the honeycomb structure decreases. In consequence, it is possible to effectively suppress the deviation of the temperature distribution in the extending direction of the cells 2 of the honeycomb structure part 4. FIG. 8 is a front view schematically showing this further embodiment of the honeycomb structure of the present invention. FIG. 9 is a schematic view showing a cross section of the further embodiment of the honeycomb structure of the present invention which is perpendicular to the cell extending direction.

The electrical resistivity of the center portion 21X is preferably from 0.0001 to 70%, further preferably from 0.001 to 50%, and especially preferably from 0.001 to 10% of the electrical resistivity of each of the extended portions 21Y and 21Y. When the electrical resistivity is smaller than 0.0001%, the flow of the current in an outer peripheral direction decreases in the cross section perpendicular to a central axis of the honeycomb structure part, and the deviation of the temperature distribution increases sometimes. When the electrical resistivity is larger than 70%, the effect of suppressing the deviation of the temperature distribution of the honeycomb structure 400 deteriorates sometimes.

Moreover, in the honeycomb structure of the present embodiment, a Young's modulus of the electrode part 21 is preferably from 2 to 50 GPa, further preferably from 3 to 45 GPa, and especially preferably from 3 to 35 GPa. In such a range of the Young's modulus of the electrode part 21, an isostatic strength of the electrode part 21 can be acquired, and cracks are not easily generated in the honeycomb structure part. When the Young's modulus of the electrode part 21 is smaller than 2 GPa, the isostatic strength of the electrode part 21 cannot be acquired sometimes. When the Young's modulus of the electrode part 21 is larger than 50 GPa, the rigidity enhances, and hence the cracks are easily generated in the honeycomb structure part sometimes. The Young's modulus may be uniform in the electrode part 21, or may partially vary. When the Young's modulus partially varies and the Young's modulus of a part of the electrode part is in the above range, the above effect can be acquired, and when the Young's modulus of all of the electrode part is in the above range, the above effect further enhances.

The Young's modulus of each of the electrode parts is a value measured by a bending resonance method in conformity to JIS R1602. As a test piece for use in the measurement, there is used a test piece obtained by laminating a plurality of sheets made of an electrode part forming raw material to form the electrode part, to obtain a laminated body, drying this laminated body, and then cutting the laminated body into a size of 3 mm×4 mm×40 mm.

In the honeycomb structure of the present embodiment, a total of heat capacities of the pair of electrode parts is preferably from 2 to 150% of a heat capacity of the whole outer peripheral wall. In such a range, an amount of the heat to be accumulated in the electrode parts decreases, and the heat shock resistance of the honeycomb structure enhances. Therefore, it is possible to suppress the generation of the large stress in the honeycomb structure part, even when the rapid temperature change takes place in the case where the honeycomb structure is mounted on the exhaust system of the internal combustion engine and used. The total of the heat capacities of the pair of electrode parts is further preferably not more than the heat capacity of the whole outer peripheral wall (i.e., from 2 to 100%), and is especially preferably smaller than the heat capacity of the whole outer peripheral wall. In consequence, the amount of the heat to be accumulated in the electrode parts further decreases, and the heat shock resistance of the honeycomb structure further enhances. Therefore, it is possible to further suppress the generation of the large stress in the honeycomb structure part, even when the rapid temperature change takes place in the case where the honeycomb structure is mounted on the exhaust system of the internal combustion engine and used. The total of the heat capacities of the pair of electrode parts is a value obtained by a heat capacity calculating method in which a porosity, a specific gravity of the material and specific heat are taken into consideration on the basis of a volume of each of the electrode parts. The above "volume of the electrode part" is a volume of each of the electrode parts which is calculated by using an average thickness and electrode angle (the center angle α in FIG. 4) of the electrode part which are measured by an optical microscope. The heat capacity of the whole outer peripheral wall is a value obtained by the heat capacity calculating method in which the porosity, the specific gravity of the material and the specific heat are taken into consideration on the basis of a volume of the outer peripheral wall. The above "volume of the outer peripheral wall" is a volume of the outer peripheral wall which is calculated by using an average thickness of the outer peripheral wall which is measured by the optical microscope. It is to be noted that in the present description, an area of a portion where the electrode part comes in contact with the side surface of the honeycomb structure part is "the contact area of the electrode part". Moreover, a cylinder which is coaxial with the honeycomb structure part and divides the electrode part is presumed, and a dividing surface of the electrode part divided by the cylinder is a virtual dividing surface. Furthermore, an area of this virtual dividing surface is "the virtual dividing area". When a boundary between the band-like electrode part and an outward projecting portion such as "the electrode terminal projecting portion" described later is not clear, "the electrode part" is a part where the above "virtual dividing area" is 90% or more of the above "contact area of the electrode part", in the calculation of "the heat capacity of the electrode part" in the present description. That is, in the above case, a part where the above "virtual dividing area" is smaller than 90% of the above "contact area of the electrode part" is not the electrode part, in the calculation of "the heat capacity of the electrode part" in the present description.

In the honeycomb structure of the present embodiment, when "the total of the heat capacities of the pair of electrode parts is smaller than the heat capacity of the whole outer peripheral wall", specifically, the total of the heat capacities of the pair of electrode parts is preferably from 2 to 80% of the heat capacity of the whole outer peripheral wall. A lower limit value is further preferably 9%, and especially preferably 15%. Moreover, an upper limit value is further preferably 75%, and especially preferably 50%. When the upper limit value is smaller than 2%, the effect of "allowing the current to further evenly flow through the whole honeycomb structure part when applying the voltage" deteriorates sometimes. When the upper limit value is larger than 80%, an effect of enhancing the heat shock resistance deteriorates sometimes.

In the honeycomb structure of the present embodiment, a thickness of the electrode part 21 is preferably from 0.01 to 5 mm, and further preferably from 0.01 to 3 mm. In such a range, the heat can evenly be generated. When the thickness of the electrode part 21 is smaller than 0.01 mm, the electrical resistance increases, and hence the heat cannot evenly be generated sometimes. When the thickness is larger than 5 mm, the electrode part is damaged sometimes at canning.

The electrode part 21 preferably contains silicon carbide particles and silicon as main components, and is further preferably made of the silicon carbide particles and silicon as raw materials, except usually contained impurities. Here, "the silicon carbide particles and silicon are contained as the main components" means that a total mass of the silicon carbide particles and silicon is 90 mass % or more of a mass of the whole electrode part. In consequence, when the electrode part 21 contains the silicon carbide particles and silicon as the main components, the components of the electrode part 21 are the same as or close to the components of the honeycomb structure part 4 (in a case where the material of the honeycomb structure part is silicon carbide). Therefore, a thermal expansion coefficient of the electrode part 21 has the same value as that of the honeycomb structure part 4, or a value close to that of the honeycomb structure part. Moreover, the materials are the same material or close materials, and hence a joining strength between the electrode part 21 and the honeycomb structure part 4 increases. Therefore, even when a heat stress is applied to the honeycomb structure, the electrode part 21 can be prevented from being peeled from the honeycomb structure part 4, and a joining portion between the electrode part 21 and the honeycomb structure part 4 can be prevented from being damaged.

A porosity of the electrode part 21 is preferably from 30 to 60%, and further preferably from 30 to 55%. In such a range of the porosity of the electrode part 21, a suitable electrical resistivity can be obtained. When the porosity of the electrode part 21 is smaller than 30%, the electrode part is deformed sometimes at manufacturing. When the porosity of the electrode part 21 is larger than 60%, the electrical resistivity excessively increases sometimes. The porosity is a value measured by a mercury porosimeter (Autopore IV950 manufactured by Micromeritics Co.).

An average pore diameter of the electrode part 21 is preferably from 5 to 45 μm, and further preferably from 7 to 40 μm. In such a range of the average pore diameter of the electrode part 21, a suitable electrical resistivity can be obtained. When the average pore diameter of the electrode part 21 is smaller than 5 μm, the electrical resistivity excessively increases sometimes. When the average pore diameter of the electrode part 21 is larger than 45 μm, the electrode part 21 has a deteriorated strength and is easily damaged sometimes. The average pore diameter is a value measured by the mercury porosimeter.

When the main components of the electrode part 21 are the silicon carbide particles and silicon, an average particle diameter of the silicon carbide particles contained in the electrode part 21 is preferably from 10 to 70 μm, and further preferably from 10 to 60 Ωcm. In such a range of the average particle diameter of the silicon carbide particles contained in the electrode part 21, the electrical resistivity of the electrode part 21 can be controlled in a range of 0.1 to 100 Ωcm. When the average pore diameter of the silicon carbide particles contained in the electrode part 21 is smaller than 10 μm, the electrical resistivity of the electrode part 21 excessively increases sometimes. When the average pore diameter of the silicon carbide particles contained in the electrode part 21 is larger than 70 μm, the electrode part 21 has a deteriorated strength and is easily damaged sometimes. The average particle diameter of the silicon carbide particles contained in the electrode part 21 is a value measured by a laser diffraction method.

A ratio of a mass of silicon contained in the electrode part 21 to "a total of respective masses of the silicon carbide particles and silicon" contained in the electrode part 21 is preferably from 20 to 50 mass %, and further preferably from 20 to 40 mass %. In such a range of the ratio of the mass of silicon to the total of the respective masses of the silicon carbide particles and silicon contained in the electrode part 21, the electrical resistivity of the electrode part 21 can be controlled in a range of 0.1 to 100 Ωcm. When the ratio of the mass of silicon to the total of the respective masses of the silicon carbide particles and silicon contained in the electrode part 21 is smaller than 20 mass %, the electrical resistivity excessively increases sometimes. When the ratio is larger than 50 mass %, the electrode part is easily deformed sometimes at the manufacturing.

In the honeycomb structure 100 of the present embodiment, a partition wall thickness is from 50 to 260 μm, and preferably from 70 to 180 μm. In such a range of the partition wall thickness, it is possible to prevent a pressure loss from being excessively increased, when the exhaust gas is allowed to flow in a case where the honeycomb structure 100 is used as a catalyst support and a catalyst is loaded onto the honeycomb structure. When the partition wall thickness is smaller than 50 μm, the strength of the honeycomb structure deteriorates sometimes. When the partition wall thickness is larger than 260 μm, the pressure loss increases sometimes when the exhaust gas is allowed to flow, in the case where the honeycomb structure 100 is used as the catalyst support and the catalyst is loaded onto the honeycomb structure.

In the honeycomb structure 100 of the present embodiment, a cell density is preferably from 40 to 150 cells/cm², and further preferably from 70 to 100 cells/cm². In such a range of the cell density, a purification performance of the catalyst can be enhanced in a state where the pressure loss at the flowing of the exhaust gas is decreased. When the cell density is smaller than 40 cells/cm², a catalyst loading area decreases sometimes. When the cell density is larger than 150 cells/cm², the pressure loss at the flowing of the exhaust gas increases sometimes, in the case where the honeycomb structure 100 is used as the catalyst support and the catalyst is loaded onto the honeycomb structure.

In the honeycomb structure 100 of the present embodiment, an average particle diameter of silicon carbide particles (aggregates) constituting the honeycomb structure part 4 is preferably from 3 to 50 μm, and further preferably from 3 to 40 μm. In such a range of the average particle diameter of the silicon carbide particles constituting the honeycomb structure part 4, the electrical resistivity of the honeycomb structure part 4 at 400° C. can be from 10 to 200 Ωcm. When the average particle diameter of the silicon carbide particles is smaller than 3 μm, the electrical resistivity of the honeycomb structure part 4 increases sometimes. When the average particle diameter of the silicon carbide particles is larger than 50 μm, the electrical resistivity of the honeycomb structure part 4 decreases sometimes. Furthermore, when the average particle diameter of the silicon carbide particles is larger than 50 μm, an extrusion forming die is clogged with a forming raw material sometimes at the extrusion forming of a formed honeycomb body. The average particle diameter of the silicon carbide particles is a value measured by the laser diffraction method.

In the honeycomb structure 100 of the present embodiment, the electrical resistivity of the honeycomb structure part 4 is from 1 to 200 Ωcm, and preferably from 40 to 100 Ωcm. When the electrical resistivity is smaller than 1 Ωcm, the current excessively flows sometimes, for example, in a case where the honeycomb structure 100 is energized by a power source of a high voltage of 200 V or more. It is to be noted that the voltage is not limited to 200V. When the electrical resistivity is larger than 200 Ωcm, the current does not easily flow and the heat is not sufficiently generated sometimes, for example, in the case where the honeycomb structure 100 is energized by the power source of the high voltage of 200 V or more. It is to be noted that the voltage is not limited to 200 V. The electrical resistivity of the honeycomb structure part is a value measured by a four-terminal method. The electrical resistivity of the honeycomb structure part is a value at 400° C.

In the honeycomb structure 100 of the present embodiment, the electrical resistivity of the electrode part 21 is preferably lower than the electrical resistivity of the honeycomb structure part 4. Furthermore, the electrical resistivity of the electrode part 21 is further preferably 20% or less, and especially preferably from 1 to 10% of the electrical resistivity of the honeycomb structure part 4. When the electrical resistivity of the electrode part 21 is 20% or less of the electrical resistivity of the honeycomb structure part 4, the electrode part 21 further effectively functions as the electrode.

In the honeycomb structure 100 of the present embodiment, when a material of the honeycomb structure part 4 is a silicon-silicon carbide composite material, "a mass of the silicon carbide particles" and "a mass of silicon" are preferably in the following relation. That is, a ratio of "the mass of silicon" to a total of "the mass of the silicon carbide particles" and "the mass of silicon" is preferably from 10 to 40 mass %, and further preferably from 15 to 35 mass %. When the ratio is smaller than 10 mass %, the strength of the honeycomb structure deteriorates sometimes. When the ratio is larger than 40 mass %, the shape cannot be retained sometimes at firing. The above "mass of the silicon carbide particles" is "the mass of the silicon carbide particles as the aggregates" contained in the honeycomb structure part 4. The above "mass of silicon" is "the mass of silicon as the binding agent" contained in the honeycomb structure part 4.

A porosity of each of the partition walls 1 of the honeycomb structure part 4 is preferably from 35 to 60%, and further preferably from 45 to 55%. When the porosity is smaller than 35%, the deformation at the firing enlarges sometimes. When the porosity is in excess of 60%, the strength of the honeycomb structure deteriorates sometimes. The porosity is a value measured by the mercury porosimeter.

An average pore diameter of the partition walls 1 of the honeycomb structure part 4 is preferably from 2 to 15 μm, and further preferably from 4 to 8 μm. When the average pore diameter is smaller than 2 μm, the electrical resistivity excessively increases sometimes. When the average pore diameter is larger than 15 μm, the electrical resistivity excessively decreases sometimes. The average pore diameter is a value measured by the mercury porosimeter.

Moreover, a thickness of the outer peripheral wall 3 constituting the outermost periphery of the honeycomb structure 100 of the present embodiment is preferably from 0.1 to 2 mm. When the thickness is smaller than 0.1 mm, the strength of the honeycomb structure 100 deteriorates sometimes. When the thickness is larger than 2 mm, an area of each of the partition walls onto which the catalyst is loaded decreases sometimes.

A shape of the cells 2 in the cross section of the honeycomb structure 100 of the present embodiment which is perpendicular to the extending direction of the cells 2 is preferably a quadrangular shape, a hexagonal shape, an octagonal shape, or a combination of these shapes. With such a cell shape, the pressure loss at the flowing of the exhaust gas through the honeycomb structure 100 decreases, to enhance the purification performance of the catalyst.

There is not any special restriction on a shape of the honeycomb structure 100 of the present embodiment. Examples of the shape include a tubular shape with a round bottom surface (a cylindrical shape), a tubular shape with an oval bottom surface, and a tubular shape including a bottom surface having a polygonal shape (a quadrangular shape, a pentangular shape, a hexagonal shape, a heptagonal shape, an octagonal shape, or the like). Moreover, as to a size of the honeycomb structure, an area of the bottom surface is preferably from 2000 to 20000 $mm^2$, and further preferably from 4000 to 10000 $mm^2$. Furthermore, a length of the honeycomb structure in a central axis direction is preferably from 50 to 200 mm, and further preferably from 75 to 150 mm.

An isostatic strength of the honeycomb structure 100 of the present embodiment is preferably 1 MPa or more, and further preferably 3 MPa or more. The isostatic strength preferably has a larger value. When a material, a constitution and the like of the honeycomb structure 100 are taken into consideration, an upper limit is about 6 MPa. When the isostatic strength is smaller than 1 MPa, the honeycomb structure is easily damaged sometimes during use of the honeycomb structure as the catalyst support or the like. The isostatic strength is a value measured under a hydrostatic pressure in water.

Figure 10:
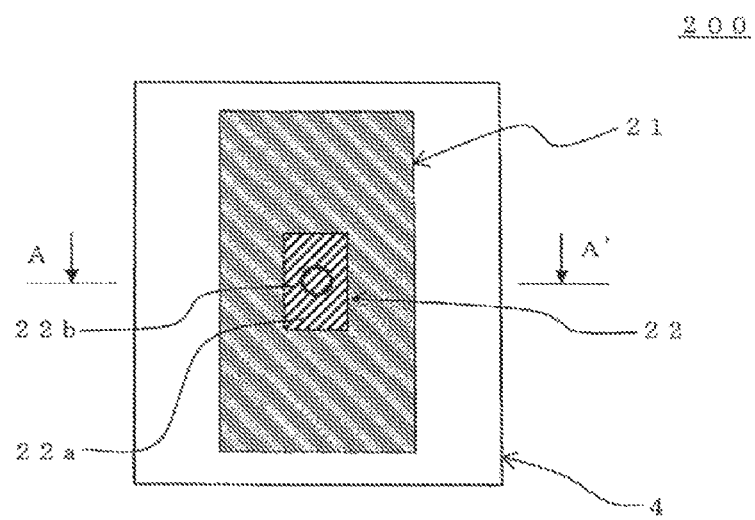
FIG. 10 is a front view schematically showing still another embodiment of the honeycomb structure of the present invention.
Figure 11:
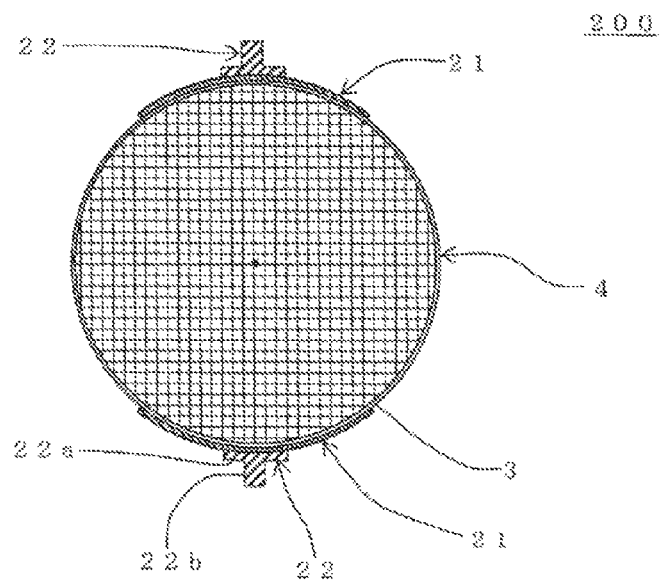
FIG. 11 is a schematic view showing a cross section taken along the line A-A' of FIG. 10.
Figure 12:
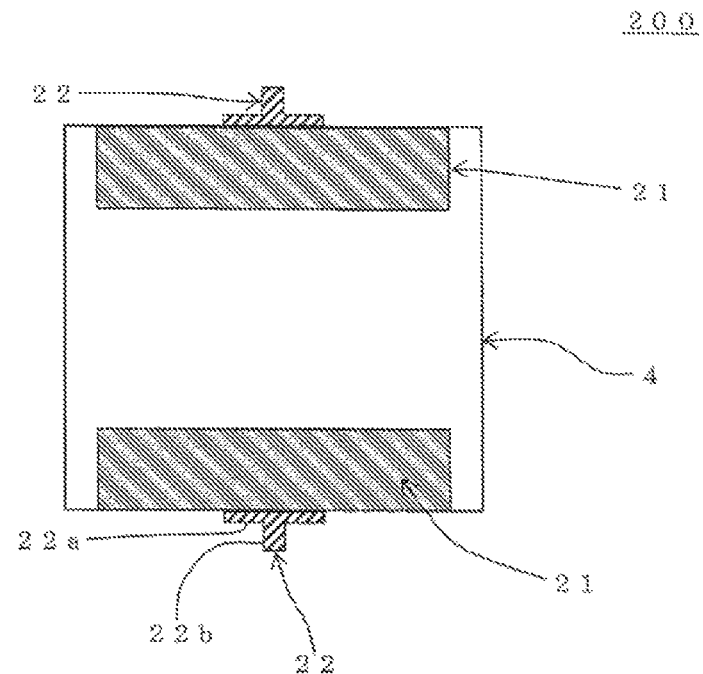
FIG. 12 is a side view schematically showing the embodiment of the honeycomb structure of the present invention.

Next, another embodiment of the honeycomb structure of the present invention will be described. As shown in FIG. 10 to FIG. 12, in a honeycomb structure 200 of the present embodiment, electrode terminal projecting portions 22 to be connected to electric wires are arranged in the honeycomb structure 100 (see FIG. 1 to FIG. 4) of the present invention. In the honeycomb structure 200, the electrode terminal projecting portions 22 are arranged in center portions of respective electrode parts 21 and 21 in a cross section perpendicular to a cell extending direction, and in center portions of the respective electrode parts in the cell extending direction. The electrode terminal projecting portions 22 are portions to be connected to the wires from a power source so that a voltage is applied between the electrode parts 21 and 21. In this manner, the electrode terminal projecting portions 22 are arranged, and hence when the voltage is applied between the electrode parts, a deviation of a temperature distribution of a honeycomb structure part can further be decreased. FIG. 10 is a front view schematically showing this further embodiment of the honeycomb structure of the present invention. FIG. 11 is a schematic view showing a cross section taken along the A-A' line of FIG. 10. FIG. 12 is a side view schematically showing the further embodiment of the honeycomb structure of the present invention.

Respective conditions of the honeycomb structure 200 of the present embodiment are preferably the same conditions as in the one embodiment of the honeycomb structure of the present invention (the honeycomb structure 100), except the following conditions (X). The conditions (X) are that "the electrode terminal projecting portions 22 to be connected to the electric wires are arranged in the center portions of the respective electrode parts 21 and 21 in the cross section perpendicular to the extending direction of cells 2, and the center portions of the electrode parts in the extending direction of the cells 2".

When main components of the electrode part 21 are silicon carbide particles and silicon, main components of the electrode terminal projecting portion 22 are preferably also the silicon carbide particles and silicon. In this way, the electrode terminal projecting portion 22 contains the silicon carbide particles and silicon as the main components, and hence the components of the electrode part 21 are the same as (or close to) the components of the electrode terminal projecting portion 22. Therefore, a thermal expansion coefficient of the electrode part 21 is the same value as that of the electrode terminal projecting portion 22 (or a close value). Moreover, materials are the same (or close), and hence a joining strength between the electrode part 21 and the electrode terminal projecting portion 22 increases. In consequence, even when a heat stress is applied to the honeycomb structure, the electrode terminal projecting portion 22 can be prevented from being peeled from the electrode part 21, and a joining portion between the electrode terminal projecting portion 22 and the electrode part 21 can be prevented from being damaged. Here, when "the electrode terminal projecting portion 22 contains the silicon carbide particles and silicon as the main components", it is meant that the electrode terminal projecting portion 22 contains 90 mass % or more of the silicon carbide particles and silicon in the whole material.

There is not any special restriction on a shape of the electrode terminal projecting portion 22, and the shape may be any shape that can be joined to the electrode part 21 and the electric wire. For example, as shown in FIG. 10 to FIG. 12, the electrode terminal projecting portion 22 preferably has a shape obtained by disposing a columnar projection 22b on a quadrangular plate-like base 22a. According to such a shape, the electrode terminal projecting portion 22 can firmly be joined to the electrode part 21 by the base 22a. Moreover, the electric wire can securely be joined to the electrode terminal projecting portion by the projection 22b.

In the electrode terminal projecting portion 22, a thickness of the base 22a is preferably from 1 to 5 mm. The electrode terminal projecting portion 22 having such a thickness can securely be joined to the electrode part 21. When the thickness is smaller than 1 mm, the base 22a weakens, and the projection 22b is easily removed from the base 22a sometimes. When the thickness is larger than 5 mm, a space where the honeycomb structure is disposed enlarges more than necessary.

In the electrode terminal projecting portion 22, a length (a width) of the base 22a is preferably from 10 to 50%, and further preferably from 20 to 40% of a length of the electrode part 21. In such a range, the electrode terminal projecting portion 22 is not easily removed from the electrode part 21. When the length is shorter than 10%, the electrode terminal projecting portion 22 is easily removed from the electrode part 21 sometimes. When the length is longer than 50%, a mass increases sometimes. The above "length (width) of the base 22a" is a length of the base 22a in "an outer peripheral direction in a cross section of a honeycomb structure part 4 which is perpendicular to the cell extending direction". The above "length of the electrode part 21" is a length of the electrode part 21 "in the outer peripheral direction in the cross section of the honeycomb structure part 4 which is perpendicular to the cell extending direction (the direction along the outer periphery)". In the electrode terminal projecting portion 22, the length of the base 22a in "the extending direction of the cells 2" is preferably from 5 to 30% of a length of the honeycomb structure part 4 in the cell extending direction. In such a range of the length of the base 22a in "the extending direction of the cells 2", a sufficient joining strength is obtained. When the length of the base 22a in "the extending direction of the cells 2" is shorter than 5% of the length of the honeycomb structure part 4 in the cell extending direction, the base is easily removed from the electrode part 21 sometimes. Moreover, when the length is longer than 30%, the mass increases sometimes.

In the electrode terminal projecting portion 22, a thickness of the projection 22b is preferably from 3 to 15 mm. The electric wire can securely be joined to the projection 22b having such a thickness. When the thickness is smaller than 3 mm, the projection 22b is easily broken sometimes. When the thickness is larger than 15 mm, the electric wire is not easily connected sometimes. Moreover, a length of the projection 22b is preferably from 3 to 20 mm. The electric wire can securely be joined to the projection 22b having such a length. When the length is shorter than 3 mm, the electric wire is not easily joined sometimes. When the length is longer than 20 mm, the projection 22b is easily broken sometimes.

An electrical resistivity of the electrode terminal projecting portion 22 is preferably from 0.1 to 2.0 Ωcm, and further preferably from 0.1 to 1.0 Ωcm. In such a range of the electrical resistivity of the electrode terminal projecting portion 22, a current can efficiently be supplied from the electrode terminal projecting portion 22 to the electrode part 21 in a piping line through which a high-temperature exhaust gas flows. When the electrical resistivity of the electrode terminal projecting portion 22 is larger than 2.0 Ωcm, the current does not easily flow, and hence the current is not easily supplied to the electrode part 21 sometimes.

A porosity of the electrode terminal projecting portion 22 is preferably from 30 to and further preferably from 30 to 40%. In such a range of the porosity of the electrode terminal projecting portion 22, a suitable electrical resistivity can be obtained. When the porosity of the electrode terminal projecting portion 22 is higher than a strength of the electrode terminal projecting portion 22 deteriorates sometimes. In particular, when the strength of the projection 22b deteriorates, the projection 22b is easily broken sometimes. The porosity is a value measured by a mercury porosimeter.

An average pore diameter of the electrode terminal projecting portion 22 is preferably from 5 to 20 μm, and further preferably from 7 to 15 μm. In such a range of the average pore diameter of the electrode terminal projecting portion 22, a suitable electrical resistivity can be obtained. When the average pore diameter of the electrode terminal projecting portion 22 is larger than 20 μm, the strength of the electrode terminal projecting portion 22 deteriorates sometimes. In particular, when the strength of the projection 22b deteriorates, the projection 22b is easily broken sometimes. The average pore diameter is a value measured by the mercury porosimeter.

When main components of the electrode terminal projecting portion 22 are silicon carbide particles and silicon, an average particle diameter of the silicon carbide particles contained in the electrode terminal projecting portion 22 is preferably from 10 to 60 µm, and further preferably from 20 to 60 µm. In such a range of the average particle diameter of the silicon carbide particles contained in the electrode terminal projecting portion 22, the electrical resistivity of the electrode terminal projecting portion 22 can be from 0.1 to 2.0 Ωcm. When an average pore diameter of the silicon carbide particles contained in the electrode terminal projecting portion 22 is smaller than 10 µm, the electrical resistivity of the electrode terminal projecting portion 22 excessively increases sometimes. When the average pore diameter of the silicon carbide particles contained in the electrode terminal projecting portion 22 is larger than 60 µm, the electrical resistivity of the electrode terminal projecting portion 22 excessively decreases sometimes. The average particle diameter of the silicon carbide particles contained in the electrode terminal projecting portion 22 is a value measured by a laser diffraction method.

A ratio of a mass of silicon contained in the electrode terminal projecting portion 22 to "a total of respective masses of the silicon carbide particles and silicon" contained in the electrode terminal projecting portion 22 is preferably from 20 to 40 mass %, and further preferably from 25 to 35 mass %. In such a range of the ratio of the mass of silicon to the total of the respective masses of the silicon carbide particles and silicon contained in the electrode terminal projecting portion 22, the electrical resistivity of 0.1 to 2.0 Ωcm can easily be obtained. When the ratio of the mass of silicon to the total of the respective masses of the silicon carbide particles and silicon contained in the electrode terminal projecting portion 22 is smaller than 20 mass %, the electrical resistivity excessively increases sometimes. Moreover, when the ratio is larger than 40 mass %, the electrode terminal projecting portions are deformed sometimes at manufacturing.

Figure 13:
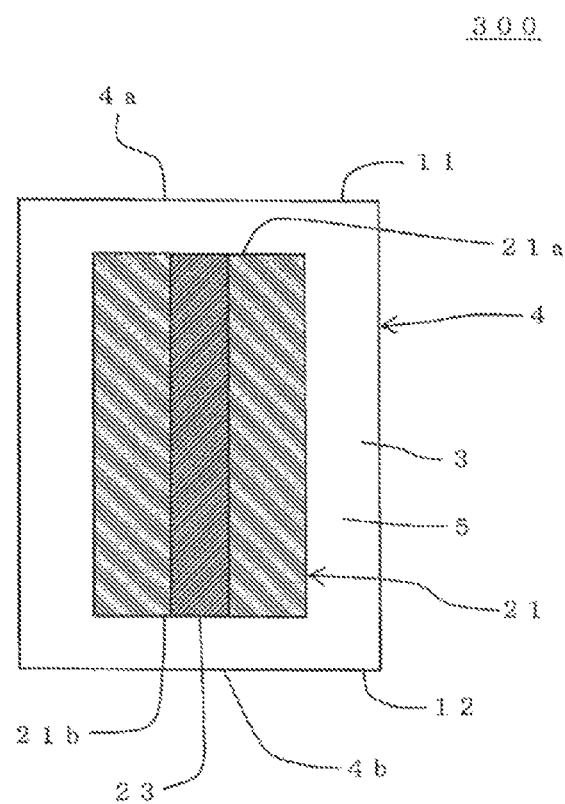
FIG. 13 is a front view schematically showing a still further embodiment of the honeycomb structure of the present invention.

Next, a still further embodiment of the honeycomb structure of the present invention will be described. A honeycomb structure 300 of the present embodiment has a constitution in which a conductor 23 having an electrical resistivity lower than that of the electrode part 21 is disposed on the surface of an electrode part 21 in the above-mentioned one embodiment (the honeycomb structure 100) of the honeycomb structure of the present invention shown in FIG. 1 to FIG. 4. Therefore, the honeycomb structure 300 of the present embodiment preferably has the same conditions as those of the honeycomb structure 100 of the present invention (see FIG. 1 to FIG. 4), except that the honeycomb structure has the conductor 23. FIG. 13 is a front view schematically showing this still further embodiment of the honeycomb structure of the present invention.

Consequently, in the honeycomb structure 300 of the present embodiment, the conductor 23 having the electrical resistivity lower than that of the electrode part 21 is disposed on the surface of the electrode part 21. Therefore, by applying a voltage to the conductor 23, it is possible to allow a current to more evenly flow through the whole honeycomb structure part.

The electrical resistivity of the conductor 23 is preferably from 0.0001 to further preferably from 0.001 to 50%, and especially preferably from 0.001 to 10% of the electrical resistivity of the electrode part 21. When the electrical resistivity is smaller than 0.0001%, the flow of the current in an outer peripheral direction in a cross section perpendicular to the central axis of the honeycomb structure part decreases, and a deviation of a temperature distribution increases sometimes. When the electrical resistivity is larger than an effect of the honeycomb structure 300 to suppress the deviation of the temperature distribution deteriorates sometimes. The electrical resistivity is a value at 400° C.

There is not any special restriction on a shape of the conductor 23. As shown in FIG. 13, the shape is preferably a rectangular shape extending from one end portion 21a of the electrode part to the other end portion 21b of the electrode part. The conductor 23 does not have to be disposed along a region between both the end portions of the electrode part. That is, a space may be made between an end portion of the conductor 23 and the end portion of the electrode part. A length of the conductor 23 is preferably 50% or more, further preferably 80% or more, and especially preferably 100% of a length of the electrode part 21. When the length is shorter than 50%, the effect of allowing the current to more evenly flow through the whole honeycomb structure part when the voltage is applied deteriorates sometimes. The above "length of the conductor 23" is a length in an extending direction of "cells of the honeycomb structure part". The above "length of the electrode part 21" is a length in the extending direction of "the cells of the honeycomb structure part".

Moreover, there is not any special restriction on a length of the conductor 23 in a peripheral direction (the peripheral direction in an outer periphery of the honeycomb structure part), as long as the length is not more than the length of the electrode part in the peripheral direction. The length of the conductor 23 in the peripheral direction is preferably from 5 to 75%, and further preferably from 10 to 60% of the length of the electrode part in the peripheral direction. When the length is longer than 75%, a temperature of the honeycomb structure part easily rises in the vicinities of both ends of the electrode part 21 sometimes, in a cross section perpendicular to the cell extending direction. When the length is shorter than 5%, the effect of allowing the current to more evenly flow through the whole honeycomb structure part when the voltage is applied deteriorates sometimes.

An example of a material of the conductor 23 is a material formed by impregnating a silicon carbide structural body with silicon so as to achieve a porosity of 5% or less.

Moreover, a thickness of the conductor 23 is preferably from 0.1 to 2 mm, further preferably from 0.2 to 1.5 mm, and especially preferably from 0.3 to 1 mm. When the thickness is larger than 2 mm, a heat shock resistance of the honeycomb structure deteriorates sometimes. When the thickness is smaller than 0.1 mm, a strength of the conductor 23 deteriorates sometimes.

It is to be noted that the honeycomb structure of the present embodiment can be used as a catalyst support. The honeycomb structure of the present embodiment, onto which a known catalyst is loaded by a known method, can be used as a catalyst for treatment of an exhaust gas.

(2) Manufacturing Method of Honeycomb Structure:

Next, a manufacturing method of the honeycomb structure of the present invention will be described. There will be described a method of manufacturing the honeycomb structure 200 (see FIG. 10 to FIG. 12) which is the above further embodiment of the honeycomb structure of the present invention (hereinafter referred to as "a manufacturing method (A)" sometimes).

First, metal silicon powder (metal silicon), a binder, a surfactant, a pore former, water and the like are added to silicon carbide powder (silicon carbide), to prepare a forming raw material. A mass of metal silicon is preferably from 10 to 40 mass % of a total of a mass of the silicon carbide powder and the mass of metal silicon. An average particle diameter of silicon carbide particles in the silicon carbide powder is preferably from 3 to 50 μm, and further preferably from 3 to 40 μm. An average particle diameter of metal silicon (the metal silicon powder) is preferably from 2 to 35 μm. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder. It is to be noted that this is a blend of the forming raw material when the material of the honeycomb structure part is a silicon-silicon carbide composite material. When the material of the honeycomb structure part is silicon carbide, metal silicon is not added.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as pores are formed after the firing, but examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, a die is clogged sometimes at forming. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method in which a kneader, a vacuum clay kneader or the like is used.

Next, the kneaded material is extruded to obtain a formed honeycomb body. In the extrusion forming, a die having a desirable whole shape, cell shape, partition wall thickness, cell density and the like is preferably used. A material of the die is preferably a hard metal which does not easily wear down. The formed honeycomb body is a structure having partition walls with which a plurality of cells are formed to become through channels of a fluid, and an outer peripheral wall positioned on an outermost periphery.

The partition wall thickness, cell density, outer peripheral wall thickness and the like of the formed honeycomb body can suitably be determined in accordance with a constitution of the honeycomb structure of the present invention which is to be prepared, in consideration of shrinkages at drying and firing.

The obtained formed honeycomb body is preferably dried. There is not any special restriction on a drying method, and examples of the method include electromagnetic heating systems such as microwave heating drying and high-frequency dielectric heating drying, and external heating systems such as hot air drying and superheat vapor drying. In these examples, it is preferable that a predetermined amount of water content is dried by the electromagnetic heating system, and then the remaining water content is dried by the external heating system. The whole formed body can immediately and evenly be dried so that any cracks are not generated. As drying conditions, it is preferable that the water content of 30 to 99 mass % of an amount of the water content prior to the drying is removed by the electromagnetic heating system, and then the water content is decreased to 3 mass % or less by the external heating system. The electromagnetic heating system is preferably the dielectric heating drying. The external heating system is preferably the hot air drying.

When the length of the formed honeycomb body in the central axis direction is not a desirable length, both end surfaces (both end portions) of the formed honeycomb body are preferably cut so as to achieve the desirable length. There is not any special restriction on a cutting method, and an example of the cutting method is a method using a disc saw cutter or the like.

Next, an electrode part forming raw material to form the electrode parts is prepared. When the main components of the electrode parts are silicon carbide and silicon, the electrode part forming raw material is preferably formed by adding predetermined additives to silicon carbide powder and silicon powder, followed by kneading. It is to be noted that when the electrode part constituted of the center portion and the extended portions is formed, a center portion forming raw material and an extended portion forming raw material are prepared, respectively. When main components of the center portion are silicon carbide and silicon, the center portion forming raw material is preferably obtained by adding predetermined additives to silicon carbide powder and silicon powder, followed by kneading. When main components of the extended portions are silicon carbide and silicon, the extended portion forming raw material is preferably obtained by adding predetermined additives to silicon carbide powder and silicon powder, followed by kneading.

Specifically, metal silicon powder (metal silicon), a binder, a surfactant, a pore former, water and the like are added to the silicon carbide powder (silicon carbide), and kneaded to prepare the electrode part forming raw material. A mass of metal silicon is preferably from 20 to 40 parts by mass, when a total mass of the silicon carbide powder and metal silicon is 100 parts by mass. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode part forming raw material. There is not any special restriction on a kneading method, and, for example, a vertical stirrer can be used.

Next, the obtained electrode part forming raw material is preferably applied to the side surface of the dried formed honeycomb body. There is not any special restriction on a method of applying the electrode part forming raw material to the side surface of the formed honeycomb body, and, for example, a printing method can be used. Moreover, the electrode part forming raw material is preferably applied to the side surface of the formed honeycomb body so as to achieve the shapes and arrangement of the electrode parts in the above honeycomb structure of the present invention. Specifically, the electrode part forming raw material is preferably applied to the side surface of the formed honeycomb body so that the distance D1 is from 1 to 10% of the length L of the honeycomb structure part 4 in the extending direction of the cells 2 as in the one embodiment of the honeycomb structure of the present invention shown in FIG. 1 to FIG. 3. The distance D1 is a distance from the one end portion 4a of the honeycomb structure part 4 in the extending direction of the cells 2 to the end portion of the electrode part 21 (the one end portion 21a of the electrode part) which faces the one end portion 4a of the honeycomb structure part 4 in the extending direction of the cells 2. Furthermore, the electrode part forming raw material is preferably similarly applied to the side surface of the formed honeycomb body so that the distance D2 is also from 1 to 10% of the length L of the honeycomb structure part 4 in the extending direction of the cells 2. The distance D2 is a distance from the other end portion 4b of the honeycomb structure part 4 in the extending direction of the cells 2 to "the end portion 21b of the electrode part 21 (the other end portion of the electrode part)" which faces "the other end portion 4b of the honeycomb structure part 4" in the extending direction of the cells 2. It is to be noted that when the electrode parts each constituted of the center portion and the extended portions are formed, each of the center portion forming raw material and the extended portion forming raw material is preferably applied to the side surface of the dried formed honeycomb body so as to achieve the shapes of the center portion 21x and extended portions 21Y of the electrode part 21 in the honeycomb structure 400 shown in FIG. 8 and FIG. 9. There is not any special restriction on a method of applying the center portion forming raw material and the extended portion forming raw material to the side surface of the formed honeycomb body, and similarly to the case where the electrode part forming raw material is applied, for example, the printing method can be used.

In another preferable configuration, when the electrode part forming raw material is applied to the side surface of the formed honeycomb body, the outer peripheral shape of the formed electrode part is the following shape. That is, the shape is a rectangular shape including at least one curved corner portion, or a rectangular shape including at least one linearly chamfered corner portion. In still another preferable configuration, the shape of at least one end portion of the formed electrode part in "the cell extending direction of the honeycomb structure part" is a waved shape.

A thickness of each of the electrode parts can be set to a desirable thickness, by regulating the thickness of the electrode part forming raw material when the material is applied. In consequence, the electrode part can be formed simply by applying the electrode part forming raw material to the side surface of the formed honeycomb body, and carrying out the drying and firing. Therefore, the electrode part can very easily be formed.

Next, the electrode part forming raw material applied to the side surface of the formed honeycomb body is preferably dried. In consequence, it is possible to obtain "the dried "formed honeycomb body to which the electrode part forming raw material is applied (any electrode terminal projecting portion forming members are not attached)"". A drying condition is preferably from 50 to 100° C.

Next, the electrode terminal projecting portion forming member is preferably prepared. The electrode terminal projecting portion forming member is attached to the formed honeycomb body, to form the electrode terminal projecting portion. There is not any special restriction on a shape of the electrode terminal projecting portion forming member, but a shape shown in, for example, FIG. 10 to FIG. 12 is preferably formed. Moreover, the obtained electrode terminal projecting portion forming member is preferably attached to a portion to which the electrode part forming raw material is applied, in the formed honeycomb body to which the electrode part forming raw material is applied. It is to be noted that an order of the preparation of the formed honeycomb body, the preparation of the electrode part forming raw material and the preparation of the electrode terminal projecting portion forming member may be any order.

The electrode terminal projecting portion forming member is preferably obtained by forming and drying an electrode terminal projecting portion forming raw material (the raw material to form the electrode terminal projecting portion forming member). When the main components of the electrode terminal projecting portion are silicon carbide and silicon, the electrode terminal projecting portion forming raw material is preferably formed by adding predetermined additives to silicon carbide powder and silicon powder and kneading this mixture.

Specifically, metal silicon powder (metal silicon), a binder, a surfactant, a pore former, water and the like are added to the silicon carbide powder (silicon carbide), and kneaded to prepare the electrode terminal projecting portion forming raw material. A mass of metal silicon is preferably from 20 to 40 mass % of a total of a mass of the silicon carbide powder and the mass of metal silicon. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon particles (metal silicon) are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 40 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the electrode terminal projecting portion forming raw material. There is not any special restriction on a kneading method, and, for example, a kneader can be used.

There is not any special restriction on a method of forming the obtained electrode terminal projecting portion forming raw material, to achieve a shape of the electrode terminal projecting portion forming member, and an example of the method is a method of carrying out processing after extrusion forming.

It is preferable that the electrode terminal projecting portion forming raw material is formed into the shape of the electrode terminal projecting portion forming member, and then dried to obtain the electrode terminal projecting portion forming member. A drying condition is preferably from 50 to 100° C.

Next, the electrode terminal projecting portion forming member is preferably attached to the formed honeycomb body to which the electrode part forming raw material is applied. There is not any special restriction on a method of attaching the electrode terminal projecting portion forming member to the formed honeycomb body (the portion of the formed honeycomb body to which the electrode part forming raw material is applied). The electrode terminal projecting portion forming member is preferably attached to the formed honeycomb body by use of the above electrode part forming raw material. For example, first, the electrode part forming raw material is applied to "the surface" of the electrode terminal projecting portion forming member "which is attached to the formed honeycomb body (the surface which comes in contact with the formed honeycomb body)". Afterward, the electrode terminal projecting portion forming member is preferably attached to the formed honeycomb body so that "the surface to which the electrode part forming raw material is applied" comes in contact with the formed honeycomb body.

Then, "the formed honeycomb body to which the electrode part forming raw material is applied and the electrode terminal projecting portion forming member is attached" is preferably dried and fired, to obtain the honeycomb structure of the present invention. It is to be noted that when the one embodiment (the honeycomb structure 100, see FIG. 1 to FIG. 4) of the honeycomb structure of the present invention is prepared, the above dried "formed honeycomb body to which the electrode part forming raw material is applied (any electrode terminal projecting portion forming members are not attached)" may be fired.

A drying condition at this time is preferably from 50 to 100° C.

Moreover, prior to the firing, calcinating is preferably performed to remove the binder and the like. The calcinating is preferably performed at 400 to 500° C. in the atmosphere for 0.5 to 20 hours. There is not any special restriction on a calcinating and firing method, and the firing can be performed by using an electric furnace, a gas furnace or the like. As firing conditions, heating is preferably performed at 1400 to 1500° C. in an inert atmosphere of nitrogen, argon or the like for one to 20 hours. Moreover, after the firing, an oxidation treatment is preferably performed at 1200 to 1350° C. for one to ten hours, to enhance a durability.

It is to be noted that the electrode terminal projecting portion forming member may be attached before or after firing the formed honeycomb body. When the electrode terminal projecting portion forming member is attached to the formed honeycomb body which has been fired, the fired formed honeycomb body is preferably then fired again on the above conditions.

Next, a manufacturing method of the honeycomb structure 300 shown in FIG. 13 will be described. According to the manufacturing method of the honeycomb structure 300, in the above manufacturing method (A), "the dried formed honeycomb body" is prepared, and then the electrode terminal projecting portion forming member is not attached, but the conductor 23 is disposed.

An example of a method of disposing the conductor 23 in "the dried formed honeycomb body" is a method of attaching the conductor 23 to the surface of the electrode part, and performing the firing. The above "dried formed honeycomb body" is the dried "formed honeycomb body to which the electrode part forming raw material is applied (any electrode terminal projecting portion forming members are not attached)".

EXAMPLES

Hereinafter, examples of the present invention will specifically be described, but the present invention is not limited to these examples.

Example 1

Silicon carbide (SiC) powder and metal silicon (Si) powder were mixed at a mass ratio of 80:20. To this mixture, hydroxypropyl methylcellulose as a binder and a water-absorbing resin as a pore former were added, and water was added, to prepare a forming raw material. Afterward, the forming raw material was kneaded by a vacuum clay kneader, to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 μm. An average particle diameter of the metal silicon powder was 6 μm. Moreover, an average particle diameter of the pore former was 20 μm. The average particle diameters of silicon carbide, metal silicon and the pore former were values measured by a laser diffraction method.

The obtained columnar kneaded material was formed by using an extrusion forming machine, to obtain a formed honeycomb body. The obtained formed honeycomb body was subjected to high-frequency dielectric heating and drying. Afterward, the formed honeycomb body was dried at 120° C. for two hours by use of a hot air drier, and both end surfaces of the formed honeycomb body were cut as much as predetermined amounts.

Next, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added, and mixed. This mixture was kneaded to prepare an electrode part forming raw material. A content of the binder was 0.5 part by mass, when a total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 μm. An average particle diameter of the metal silicon powder was 6 μm. The average particle diameters of silicon carbide and metal silicon were values measured by the laser diffraction method. The kneading was carried out by a vertical stirrer.

Next, the electrode part forming raw material was applied, in a band-like state, to the side surface of the dried formed honeycomb body so that a thickness of the material (the thickness after drying and firing) was 0.25 mm and "0.5 times a center angle was 49.3° in a cross section perpendicular to a cell extending direction". The electrode part forming raw material was applied to two portions of the side surface of the dried formed honeycomb body. Then, in the cross section perpendicular to the cell extending direction, one of the two portions to which the electrode part forming raw material was applied was disposed opposite to the other portion via the center of the formed honeycomb body. A shape of the electrode part forming raw material applied to the side surface of the formed honeycomb body was a rectangular shape. Then, the electrode part forming raw material was applied to the side surface of the formed honeycomb body so that each of distances D1 and D2 was 1% of a length of a honeycomb structure part in the cell extending direction, in the obtained honeycomb structure. The distance D1 was a distance from one end portion of the honeycomb structure part in the cell extending direction to "an end portion of an electrode part" which faced the one end portion of the honeycomb structure part in the cell extending direction. That is, the distance D1 was a distance between "the honeycomb end portion and the electrode part end portion". The distance D2 was a distance from the other end portion of the honeycomb structure part in the cell extending direction to "an end portion of the electrode part" which faced the other end portion of the honeycomb structure part in the cell extending direction. That is, the distance D2 was a distance between "the honeycomb end portion and the electrode part end portion". That is, in the obtained honeycomb structure, the distance from each of both the end portions of the electrode part to each of both the end portions of the honeycomb structure part was 1% of "the length of the honeycomb structure part in the cell extending direction".

Next, the electrode part forming raw material applied to the formed honeycomb body was dried. A drying condition was 70° C.

Next, silicon carbide (SiC) powder and metal silicon (Si) powder were mixed at a mass ratio of 60:40. To this mixture, hydroxypropyl methylcellulose as a binder was added, and water was also added, and mixed. This mixture was kneaded to prepare an electrode terminal projecting portion forming raw material. The electrode terminal projecting portion forming raw material was kneaded by using a vacuum clay kneader, to prepare a kneaded material. A content of the binder was 4 parts by mass, when a total of the silicon carbide (SiC) powder and the metal silicon (Si) powder was 100 parts by mass. A content of the water was 22 parts by mass, when the total of the silicon carbide (SiC) powder and the metal silicon (Si) powder was 100 parts by mass. An average particle diameter of the silicon carbide powder was 52 μm. An average particle diameter of the metal silicon powder was 6 μm. The average particle diameters of silicon carbide and metal silicon were values measured by the laser diffraction method.

The obtained kneaded material was processed into a shape (the shape constituted of a base and a projection) as in an electrode terminal projecting portion 22 shown in FIG. 10 to FIG. 12, and was dried, to obtain an electrode terminal projecting portion forming member. Moreover, a drying condition was 70° C. A portion corresponding to a plate-like base 22a had a size of "3 mm×12 mm×15 mm". Moreover, a portion corresponding to a projection 22b was a columnar portion having a bottom surface diameter of 7 mm and a length of 10 mm in a central axis direction. Two electrode terminal projecting portion forming members were prepared.

Next, the two electrode terminal projecting portion forming members were attached to two portions of the formed honeycomb body to which the electrode part forming raw material was applied, respectively. The electrode terminal projecting portion forming members were attached to the portions of the formed honeycomb body to which the electrode part forming raw material was applied, by use of the electrode part forming raw material. Afterward, "the formed honeycomb body to which the electrode part forming raw material was applied and the electrode terminal projecting portion forming members were attached" was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

An average pore diameter (an air pore diameter) of partition walls of the obtained honeycomb structure was 8.6 μm. A porosity was 45%. The average pore diameter and the porosity were values measured by a mercury porosimeter. Furthermore, a thickness of each of the partition walls of the honeycomb structure was 101.6 μm, and a cell density was 93 cells/cm$^2$. Moreover, a bottom surface of the honeycomb structure had a round shape of a diameter of 93 mm. A length of the honeycomb structure in the cell extending direction was 100 mm. Furthermore, an isostatic strength of the obtained honeycomb structure was 2.5 MPa. The isostatic strength was a breaking strength measured under a hydrostatic pressure in water. Additionally, 0.5 times the center angle in the cross section of each of two electrode parts of the honeycomb structure which was perpendicular to the cell extending direction was 49.3°. Moreover, a thickness of each of the electrode parts was 0.25 mm. Furthermore, an electrical resistivity of the electrode part was 0.8 Ωcm, an electrical resistivity of a honeycomb structure part was 40 Ωcm, and an electrical resistivity of an electrode terminal projecting portion was 0.8 Ωcm. Moreover, the distance from each of both the end portions of the electrode part to each of both the end portions of the honeycomb structure part (the distance between "the honeycomb end portion and the electrode part end portion") was (1 mm) of "the length of the honeycomb structure part in the cell extending direction".

Additionally, the electrical resistivities of the honeycomb structure part, each of the electrode parts and each of the electrode terminal projecting portions were measured by the following method. A test piece of 10 mm×10 mm×50 mm was prepared by using the same material as that of an object to be measured. That is, when the electrical resistivity of the honeycomb structure part was measured, the test piece was prepared by using the same material as that of the honeycomb structure part. When the electrical resistivity of the electrode part was measured, the test piece was prepared by using the same material as that of the electrode part. Moreover, when the electrical resistivity of the electrode terminal projecting portion was measured, the test piece was prepared by using the same material as that of the electrode terminal projecting portion. All surfaces of both end portions (both the end portions in a longitudinal direction) of each of the test pieces were coated with a silver paste, and provided with a wiring line, thereby enabling energization. A voltage applying current measuring device was connected to the test piece, to apply a voltage thereto. A thermocouple was disposed in the center of the test piece, and a change of a temperature of the test piece with an elapse of time when applying the voltage was confirmed by a recorder. A voltage of 100 to 200 V was applied, and a current value and a voltage value were measured in a state where the temperature of the test piece was 400° C. The electrical resistivity was calculated from the obtained current value and voltage value, and a test piece dimension.

"A maximum stress" of the obtained honeycomb structure was measured by the following method. Moreover, "a temperature difference in a longitudinal direction" when applying the voltage of 200 V to the obtained honeycomb structure was measured by the following method. The results are shown in Table 1.

(Maximum Stress)

A gas burner test machine was used to carry out a heating cooling test of the honeycomb structure. In this case, a temperature in the honeycomb structure was measured to calculate the maximum stress in the honeycomb structure. In the above gas burner test machine, it was possible to supply a heated gas into a metal case containing the honeycomb structure by use of a gas burner. Specifically, in the heating cooling test, the obtained honeycomb structure was first contained (canned) in the metal case of the gas burner test machine. Then, the gas heated by the gas burner was supplied into the metal case, and was allowed to flow through the honeycomb structure. Temperature conditions (inlet gas temperature conditions) of the heated gas flowing into the metal case were as follows. First, the temperature of the gas was raised up to 950° C. for five minutes, and then held at 950° C. for ten minutes. Afterward, the honeycomb structure was cooled down to 100° C. at a rate of five minutes, and then the temperature was held at 100° C. for ten minutes. Afterward, a heating cooling cycle in which "after raising the temperature from 100° C. to 950° C. for five minutes, the honeycomb structure was held at 950° C. for ten minutes, and then cooled down to 100° C. for five minutes" was repeated as much as 100 cycles. In the above heating cooling cycles, the temperature in the honeycomb structure was measured. The maximum stress to be generated was obtained from the obtained data by FEM analysis (a finite element method). A maximum stress of 52.0 MPa or less was passable.

(Temperature Difference in Longitudinal Direction)

A voltage of 200 V was applied to the obtained honeycomb structure. At that time, there was measured the highest temperature of the cross section of the honeycomb structure part which was perpendicular to the cell extending direction in "a center portion" of the honeycomb structure part "in the cell extending direction". The temperature of the cross section was measured by a thermocouple. The lowest temperature of the end surface of the honeycomb structure part was measured by using a thermovision. The temperature difference in the longitudinal direction was a difference between the above highest temperature of the cross section and the above lowest temperature of the end surface. A longitudinal direction temperature difference of 120° C. or less was passable.

TABLE 1

| | Distance between "honeycomb end portion and electrode part end portion" (mm) | Max. stress (Mpa) | Temp. difference in longitudinal direction (° C.) |
|---|---|---|---|
| Example 1 | 1 | 51.0 | 105 |
| Example 2 | 3 | 49.5 | 108 |
| Example 3 | 5 | 48.7 | 110 |
| Example 4 | 6 | 48.4 | 110 |
| Example 5 | 8 | 48.0 | 115 |
| Example 6 | 10 | 48.0 | 120 |
| Comparative Example 1 | 0 | 54.0 | 105 |
| Comparative Example 2 | 0.5 | 53.2 | 105 |
| Comparative Example 3 | 12 | 48.0 | 135 |
| Comparative Example 4 | 15 | 48.0 | 160 |

Examples 2 to 6 and Comparative Examples 1 to 4

The procedures of Example 1 were repeated except that a distance between "a honeycomb end portion and an electrode part end portion" in each of honeycomb structures was changed as shown in Table 1, to prepare each of the honeycomb structures. Additionally, a distance from one end portion of an electrode part to one end portion of a honeycomb structure part was the same as a distance from the other end portion of the electrode part to the other end portion of the honeycomb structure part. The procedures of Example 1 were repeated to measure "a maximum stress" and "a temperature difference in a longitudinal direction" in each of the honeycomb structures. The results are shown in Table 1.

It is seen from Table 1 that when the distance between "the honeycomb end portion and the electrode part end portion" is from 1 to 10 mm, "the temperature difference in the longitudinal direction" can be decreased while decreasing "the maximum stress". It is also seen that when the distance between "the honeycomb end portion and the electrode part end portion" is smaller than 1 mm, "the maximum stress" rapidly increases. It is further seen that when the distance between "the honeycomb end portion and the electrode part end portion" is larger than 10 mm, "the temperature difference in the longitudinal direction" rapidly increases.

INDUSTRIAL APPLICABILITY

A honeycomb structure of the present invention can suitably be utilized as a catalyst support for an exhaust gas purifying device which purifies an exhaust gas of a car.

DESCRIPTION OF REFERENCE NUMERALS

1: partition wall, 2: cell, 3: outer peripheral wall, 4: honeycomb structure part, 4a: one end portion of honeycomb structure part, 4b: the other end portion of honeycomb structure part, 5: side surface, 11: one end surface, 12: the other end surface, 21: electrode part, 21a: one end portion of electrode part, 21b: the other end portion of electrode part, 21X: center portion, 21Y: extended portion, 22: electrode terminal projecting portion, 22a: base, 22b: projection, 23: conductor, 100, 200, 300, and 400: honeycomb structure, O: center, D1 and D2: distance, E and G: length of corner portion in cell direction, F and H: length of corner portion in vertical direction, I: cell extending direction, J: peripheral direction, L: length, α: center angle, and θ: angle of 0.5 time the center angle.

The invention claimed is:

1. A honeycomb structure comprising:
a tubular honeycomb structure part having porous partition walls with which a plurality of cells extending from one end surface to the other end surface are formed to become through channels of a fluid, and an outer peripheral wall positioned on an outermost periphery; and
a pair of electrode parts arranged on a side surface of the honeycomb structure part,
wherein an electrical resistivity of the porous partition walls and the outer peripheral wall of the honeycomb structure part is from 1 to 200 Ωcm,
each of the pair of electrode parts is formed into a band-like shape extending in a direction in which the cells of the honeycomb structure part extend,
in a cross section perpendicular to the cell extending direction, the one electrode part in the pair of electrode parts is disposed opposite to the other electrode part in the pair of electrode parts via the center of the honeycomb structure part, and
a distance from one end portion of the honeycomb structure part in the cell extending direction to an end portion of the electrode part which faces the one end portion of the honeycomb structure part in the cell extending direction is from 1 to 10% of a length of the honeycomb structure part in the cell extending direction.

2. The honeycomb structure according to claim 1, wherein the distance from the one end portion of the honeycomb structure part in the cell extending direction to the end portion of the electrode part which faces the one end portion of the honeycomb structure part in the cell extending direction is from 1 to 10% of the length of the honeycomb structure part in the cell extending direction, and
a distance from the other end portion of the honeycomb structure part in the cell extending direction to an end portion of the electrode part which faces the other end portion of the honeycomb structure part in the cell extending direction is from 1 to 10% of the length of the honeycomb structure part in the cell extending direction.

3. The honeycomb structure according to claim 1, wherein an outer peripheral shape of the band-like electrode part is a rectangular shape including at least one curved corner portion, or a rectangular shape including at least one linearly chamfered corner portion.

4. The honeycomb structure according to claim 2, wherein an outer peripheral shape of the band-like electrode part is a rectangular shape including at least one curved corner portion, or a rectangular shape including at least one linearly chamfered corner portion.

5. The honeycomb structure according to claim 1, wherein an electrical resistivity of the electrode part is from 0.01 to 100 Ωcm.

6. The honeycomb structure according to claim 2, wherein an electrical resistivity of the electrode part is from 0.01 to 100 Ωcm.

7. The honeycomb structure according to claim 3, wherein an electrical resistivity of the electrode part is from 0.01 to 100 Ωcm.

8. The honeycomb structure according to claim 4, wherein an electrical resistivity of the electrode part is from 0.01 to 100 Ωcm.

9. The honeycomb structure according to claim 1, wherein a conductor having an electrical resistivity lower than that of the electrode part is disposed on the surface of the electrode part.

10. The honeycomb structure according to claim 2, wherein a conductor having an electrical resistivity lower than that of the electrode part is disposed on the surface of the electrode part.

11. The honeycomb structure according to claim 3, wherein a conductor having an electrical resistivity lower than that of the electrode part is disposed on the surface of the electrode part.

12. The honeycomb structure according to claim 4, wherein a conductor having an electrical resistivity lower than that of the electrode part is disposed on the surface of the electrode part.

13. The honeycomb structure according to claim 5, wherein a conductor having an electrical resistivity lower than that of the electrode part is disposed on the surface of the electrode part.

14. The honeycomb structure according to claim 6, wherein a conductor having an electrical resistivity lower than that of the electrode part is disposed on the surface of the electrode part.

15. The honeycomb structure according to claim 7, wherein a conductor having an electrical resistivity lower than that of the electrode part is disposed on the surface of the electrode part.

16. The honeycomb structure according to claim 8, wherein a conductor having an electrical resistivity lower than that of the electrode part is disposed on the surface of the electrode part.

17. The honeycomb structure according to claim 1, wherein a distance in the cell extending direction from one end portion of both end portions of the honeycomb structure part which are away from each other in the cell extending direction, to an end portion of the electrode part which is one of both end portions of the electrode part that are away from each other in the cell extending direction and which faces the one end portion of the honeycomb structure part is from 1 to 10% of a length of the honeycomb structure part in the cell extending direction.

18. The honeycomb structure according to claim 1, wherein the pair of electrode parts are calcined and fired on the side surface of the honeycomb structure part.

\* \* \* \* \*